(12) United States Patent
Kakutani

(10) Patent No.: US 7,480,063 B2
(45) Date of Patent: Jan. 20, 2009

(54) PRINT SYSTEM PRINTING DATA WHILE STORING UNDER COMPRESSED STATE, AND PRINTER FOR USE THEREIN

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 560 days.

(21) Appl. No.: 10/539,081

(22) PCT Filed: Dec. 15, 2003

(86) PCT No.: PCT/JP03/16049

§ 371 (c)(1), (2), (4) Date: Jun. 14, 2005

(87) PCT Pub. No.: WO2004/055663

PCT Pub. Date: Jul. 1, 2004

(65) Prior Publication Data

US 2006/0050316 A1    Mar. 9, 2006

(30) Foreign Application Priority Data

Dec. 16, 2002  (JP)  .............................. 2002-363319
Sep. 10, 2003  (JP)  .............................. 2003-318427

(51) Int. Cl.
- G06K 1/00   (2006.01)
- G06K 15/10  (2006.01)
- G06K 9/36   (2006.01)
- B41C 1/04   (2006.01)
- B41J 2/385  (2006.01)

(52) U.S. Cl. .......................... 358/1.1; 358/1.2; 358/1.4; 358/1.16; 358/3.3; 358/1.8; 382/233; 347/131

(58) Field of Classification Search ................ 358/1.1, 358/1.2, 1.4, 1.16, 3.3; 347/1, 5, 131; 382/233
See application file for complete search history.

(56) References Cited

U.S. PATENT DOCUMENTS 6,315,387 B1 *  11/2001  Horikoshi .................... 347/40

FOREIGN PATENT DOCUMENTS

EP          0 835 025        4/1998

(Continued)

OTHER PUBLICATIONS

Abstract of Japanese Patent Publication No. 10-271322, Pub. Date: Oct. 9, 1998, Patent Abstracts of Japan.
Abstract of Japanese Patent Publication No. 11-001006, Pub. Date: Jan. 6, 1999, Patent Abstracts of Japan.

(Continued)

Primary Examiner—Edward L Coles
Assistant Examiner—Thomas J. Lett
(74) Attorney, Agent, or Firm—Martine Penilla & Gencarella, LLP

(57) ABSTRACT

In a printing process with a print head having multiple dot formation elements for creating dots, an overlap printing technique that uses at least two dot formation elements for formation of each raster line requires a large memory capacity for storage of dot data. In a printing system of the invention, an image processing device takes charge of a former part of image processing and outputs intermediate data in a state requiring expansion into multiple pixels to a printing device. The printing device expands intermediate data including a target pixel, for which a dot on-off state is to be specified, and specifies the dot on-off state in the target pixel based on the intermediate data. Every time the dot on-off state is specified in each target pixel, intermediate data including the target pixel is expanded. This arrangement does not require the printing device to have a large storage capacity for the image processing. The printing device and the image processing device can thus effectively share the series of image processing, even when the printing device has a small storage capacity and low processing power.

7 Claims, 27 Drawing Sheets

FOREIGN PATENT DOCUMENTS

| | | |
|---|---|---|
| EP | 0 951 176 | 10/1999 |
| JP | 10-271322 | 10/1998 |
| JP | 11-001006 | 1/1999 |
| JP | 11-331585 | 11/1999 |
| JP | 2000-115716 | 4/2000 |
| JP | 2001-130063 | 5/2001 |

OTHER PUBLICATIONS

Abstract of Japanese Patent Publication No. 11-331585, Pub. Date: Nov. 30, 1999, Patent Abstracts of Japan.

Abstract of Japanese Patent Publication No. 2000-115716, Pub. Date: Apr. 21, 2000, Patent Abstracts of Japan.

Abstract of Japanese Patent Publication No. 2001-130063, Pub. Date: May 15, 2001, Patent Abstracts of Japan.

* cited by examiner

Fig.7

RESOLUTION IN COMPUTER(720dpi)

| a | b | c | d | e |
|---|---|---|---|---|

PRINTING RESOLUTION(1440dpi)

| a1 | a2 | b1 | b2 | c1 | c2 | d1 | d2 | e1 | e2 |
|----|----|----|----|----|----|----|----|----|----|
| a3 | a4 | b3 | b4 | c3 | c4 | d3 | d4 | e3 | e4 |

(1byte × 15=15byte)

(b)  Compressed Part: Compression Flag (1bit)
  + Consecutive Number of Values (1byte)
  + Data of Identical Numerical Value (1byte)

Non-Compressed Part: Compression Flag (1bit)
  + Data(1byte)

(c) Compression Flag   Consecutive Number of Values

| 12 | 15 | ■ | 5 | 21 | 19 | ■ | 3 | 17 | 12 | 9 | ■ | 2 | 7 |

(1bit × 8+1byte × 11=12byte)

Data

Fig.16A

| 97 | 102 | 104 |
|---|---|---|
| 94 | 99 | 101 |
| 92 | 96 | 99 |

Fig.16B

| 97 | 97 | 97 | 97 | 102 | 102 | 102 | 102 | 104 | 104 | 104 | 104 |
|---|---|---|---|---|---|---|---|---|---|---|---|
| 97 | 97 | 97 | 97 | 102 | 102 | 102 | 102 | 104 | 104 | 104 | 104 |
| 94 | 94 | 94 | 94 | 99 | 99 | 99 | 99 | 101 | 101 | 101 | 101 |
| 94 | 94 | 94 | 94 | 99 | 99 | 99 | 99 | 101 | 101 | 101 | 101 |
| 92 | 92 | 92 | 92 | 96 | 96 | 96 | 96 | 99 | 99 | 99 | 99 |
| 92 | 92 | 92 | 92 | 96 | 96 | 96 | 96 | 99 | 99 | 99 | 99 |

PRINT SYSTEM PRINTING DATA WHILE STORING UNDER COMPRESSED STATE, AND PRINTER FOR USE THEREIN

TECHNICAL FIELD

The present invention relates to a technique of making an image subjected to a preset series of image processing and printing the processed image. More specifically the invention pertains to a technique of causing an image processing device and a printing device to share the preset series of image processing and print the processed image.

BACKGROUND ART

Printing devices that create dots on a printing medium to print an image are widely used as the output device of various imaging devices. In these printing devices, an image is divided into tiny areas called pixels, and dots are created in these pixels. Such a printing device takes only either of two states, a dot-on state and a dot-off state, in each pixel, but makes areas of dense dot creation and areas of sparse dot creation in the whole image. For example, in the case of creation of blank ink dots on printing paper, areas of dense dot creation are dark areas and areas of sparse dot creation are bright areas. Adequate regulation of the density of dot creation according to the tone values of an object image gives a multi-tone printed image.

The following method is generally adopted in such a printing device to create dots at adequate densities according to the tone values of an object image. The procedure first carries out a preset series of image processing of an object image to be printed and converts image data into data representing the dot on-off state in each pixel (hereafter referred to as 'dot data'). The adequate image processing of the object image generates dot data for creation of dots at the adequate densities according to the tone values of the image data. The procedure then supplies the dot data representing the dot on-off state to the printing device. The printing device creates dots in the pixels according to the received dot data. This method enables dots to be created at adequate densities according to the tone values of the image data and thereby prints a desired image.

This image printing method, however, takes a long time for transfer of processed data with an increase in number of pixels included in the object image. This prevents quick printing. With recent requirements for the enhanced picture quality and the increased image size, the number of pixels included in the image has been increasing. The high-speed printing of an image accordingly has difficulties. This problem is described, for example, in Japanese Patent Laid-Open Gazette No. 2000-15716.

Dots are created on a printing medium, such as printing paper, by dot formation elements mounted on a print head, for example, by nozzles for ejecting ink droplets. When a dot formation element has any deviation in dot creation, for example, a deviation of the hitting position of ink droplets for dot creation, raster lines formed by the dot creation element are different from raster lines formed by the other dot formation elements. This causes, for example, the occurrence of banding, which gives white streaks to a resulting print. Recent printing devices have thus formed each raster line by at least two of the multiple dot formation elements mounted on the print head. In a printing device that executes printing by forward and backward scans of the print head relative to the printing medium, each raster line is completed by multiple forward scans or backward scans. The procedure first uses one dot formation element to create dots at intervals (for example, alternately), shifts the relative position of the print head to the printing medium, and then uses another dot formation element to fill the intervals between the previously created dots and complete a raster line. This technique is called interlacing.

This technique of dot creation does not immediately use all the generated dot data but is required to store the dot data until completion of each raster line. The print head has multiple dot formation elements at intervals of several dots, and the printing device often adopts a technique of completing raster lines of a preset width by multiple forward scans or backward scans of the print head (interlacing technique). Combination of the interlacing technique with the interlacing technique drastically increases the quantity of dot data to be stored. A large memory capacity is then required for storage of the large quantity of dot data.

An image processing device (typically a computer) and a printing device may share a series of image processing. The printing device may alternatively carry out the whole series of image processing. In any case, it is required to expand dot data corresponding to the dot formation elements and store the expanded dot data. A large storage capacity is required for storing the dot data. In the case of combined use of the image processing device and the printing device for image printing, the image processing device may take charge of generation of dot data. The image processing device is typically actualized by execution of an application program for image processing on the computer. In the case of printing an image, a printer driver is activated to receive required data from the application program and generate data to be output to the printing device. When the computer has a sufficient memory capacity, the printer driver may expand and store a large quantity of dot data. This, however, undesirably increases the quantity of data transferred from the image processing device to the printing device and extends the time for data transfer.

The object of the invention is thus to eliminate the drawbacks of the prior art techniques discussed above and to provide a technique that reduces a required memory capacity for expansion of dot data and thereby carries out image processing with a high efficiency.

DISCLOSURE OF THE INVENTION

In order to attain at least part of the above and the other related objects, the invention is directed to a printing system, which has a print head with multiple dot formation elements for creating dots on a printing medium and uses at least two dot formation elements of the print head to print each raster line included in an image. The original image data are converted into converted data, which is in a form prior to expansion into dot data corresponding to the multiple dot formation elements and in a more compressed form than the dot data and is stored in a memory. The converted data stored in the memory are successively read out and are expanded into dot data for actuating the multiple dot formation elements. The dot formation elements are actuated according to the dot data, so as to print an image. The technique of the invention stores the image data in the compressed form, thus not requiring a large storage capacity. The dot data are expanded from the compressed data and are used to actuate the dot formation elements. This arrangement thus reduces the capacity of the dot data.

In one preferable application, the printing system includes an image processing device and a printing device, which efficiently share a series of image processing. In this application, incorporation of the respective modules of the printing system in the image processing device and in the printing device is freely designed. For example, some image processing like color conversion is carried out in outside of the printing device. The processed data are stored in a compressed form in a memory of the printing device. The compressed data are expanded into dot data to actuate the dot formation elements of the print head. The technique of the invention is not restricted to the printing system but is also actualized by a printing device or a printing method.

One preferable embodiment of the invention temporarily accumulates results of specification of dot on-off state in respective target pixels in the process of expansion of dot data, collects results of the specification with regard to dots formed in at least one forward pass or a backward pass, among the accumulated results of the specification, and forms raster lines.

This arrangement ensures quick formation of raster lines and thereby quick printing of an image.

In any of the printing system, the printing device, and the printing method, one preferable procedure sets a target pixel, expands data corresponding to the target pixel among the converted data stored in a state requiring expansion, and specifies the dot on-off state in the target pixel according to the expanded data.

This arrangement expands only the image data corresponding to the target pixel and prevents useless expansion of the image data, thus effectively saving the storage capacity required for expansion.

In the printing system, the printing device, or the printing method that repeats forward and backward passes on the printing medium to create dots and form raster lines as arrays of dots so as to print an image, another preferable procedure sets a target pixel, expands data including the target pixel in unit of raster lines among the stored converted data, and specifies the dot on-off state in the target pixel.

This arrangement readily specifies an object image data to be expanded, thus simplifying the processing executed by the printing device and speeds up the processing.

The procedure of the invention may compress dot data obtained by halftoning the original image data as the conversion into the converted data.

In this application, multiple raster lines apart from one another by a preset interval are formed simultaneously. The procedure of formation of multiple raster lines specifies pixels included in the raster lines, expands dot data including the specified pixels, obtains dot data representing the dot on-off state in the respective pixels, and creates dots according to the dot data, so as to print an image.

This arrangement stores the dot data in the compressed form and thus does not require a large storage capacity. In the printing system including the image processing device and the printing device, even when the printing device does not have a high processing power, the image processing device and the printing device can efficiently share the series of image processing.

One preferable embodiment of the printing system or the printing device of the invention collects a preset number of multiple pixels in the image into each pixel group and specifies a number of dots to be created in each pixel group based on the image data, so as to obtain the converted data, stores data representing the specified number of dots to be created in each pixel group as the converted data, converts the stored data representing the specified number of dots into the dot data, and simultaneously stores the converted dot data at least once with respect to M pixel sets included in each pixel group, where M is an integer of not less than 2 but of less than N, which is a total number of pixel sets included in the pixel group.

In the case of simultaneously generating dot data for all the pixels in a pixel group, since each raster line is formed in multiple forward and backward passes, it is required to store dot data of many pixels for a long time. This consumes an extremely large storage capacity. Storage of dot data of only a corresponding pixel set in synchronism with a forward or backward pass of the head, however, requires conversion of number data into dot data in each forward or backward pass of the head, thus lowering the conversion efficiency. The technique of the invention, on the other hand, generates and stores dot data with regard to two or more pixel sets at least once in each pixel group. This arrangement does not store dot data for all the pixel sets included in each pixel group and thus reduces the required storage capacity, while reducing the frequency of conversion of number data into dot data in each pixel group and thus preventing a decrease in conversion efficiency.

In the case of simultaneous storage of dot data with regard to multiple pixel sets, dot data of pixel sets other than a pixel set for immediate dot creation are to be stored until dot creation. This accordingly requires a storage capacity for storage of such dot data. Compared with storage of dot data of all the pixel sets, this arrangement still saves the required storage capacity.

The procedure for storage of dot data with regard to pixel groups may convert number data to generate dot data with regard to all the pixels included in each pixel group and store only the dot data with regard to pixels in selected pixel groups. The procedure may otherwise convert number data into dot data with regard to only pixels in selected pixel groups and store the dot data.

The printing system may simultaneously store converted dot data with regard to at least multiple pixel sets where dots are successively created in each pixel group.

When dot data of multiple pixel sets simultaneously stored are dot data of pixel sets for sequential dot creation in the pixel group, which may not be in direct succession, dot data are supplied to the head relatively soon. This arrangement saves the storage capacity required for storing the dot data.

The dot data of multiple pixel sets simultaneously stored may be dot data of the following pixel sets. The procedure may supply dot data of each pixel set included in a pixel group to the head for dot creation and simultaneously store dot data with regard to last multiple pixel sets (all the pixel sets left in the pixel group at a preset time).

When only two pixel sets without conversion of dot data are left in the pixel group, storage of dot data with regard to these pixel sets eliminates the requirement for storage of the number data with regard to these pixel sets. Namely the storage capacity used for storage of the number data is now used to store dot data for two pixel sets. As clearly understood, simultaneous conversion and storage of dot data with regard to the multiple pixel groups for which dots are lastly created in the pixel group desirably saves the storage capacity required for storing the dot data.

In another preferable application, the printing system may convert the number data into the dot data to determine pixels for dot creation according to the specified number of dots to be created in the pixel group in an order of pixels having potential for dot creation in the pixel group.

Information on the order of pixels having potential for dot creation in the pixel group, that is, information on the ordinal number of each pixel for dot creation in the pixel group, desirably facilitates generation of dot data according to the number of dots to be created in the pixel group.

The technique of the invention is not restricted to the printing device but may be actualized by a corresponding printing method, as well as by a program that is incorporated in a printing device with a computer to attain the respective functions of the printing device and a recording medium in which such a program is recorded.

BRIEF DESCRIPTION OF THE DRAWINGS

FIG. 7 shows an example of expansion of image data;

FIG. 8 shows another example of expansion of image data;

FIGS. 16A and 16B show a process of resolution conversion in the image printing routine;

BEST MODE OF CARRYING OUT THE INVENTION

In order to describe the functions and the effects of the invention clearly, some modes of carrying out the invention are discussed below in the following sequence:

A1. Mode of Carrying Out the Invention—1
    A2. Mode of Carrying Out the Invention—2
    B. Construction of Device in Embodiment
    C. General Flow of Image Processing in First Embodiment
    D. Halftoning and Interlacing Process
    E. Modification
    F. General Flow of Image Processing in Second Embodiment
    G. Number Data Generation Process
    H. Number Data Decoding Process
    A1. Mode of Carrying Out the Invention—1

Figure 1A:
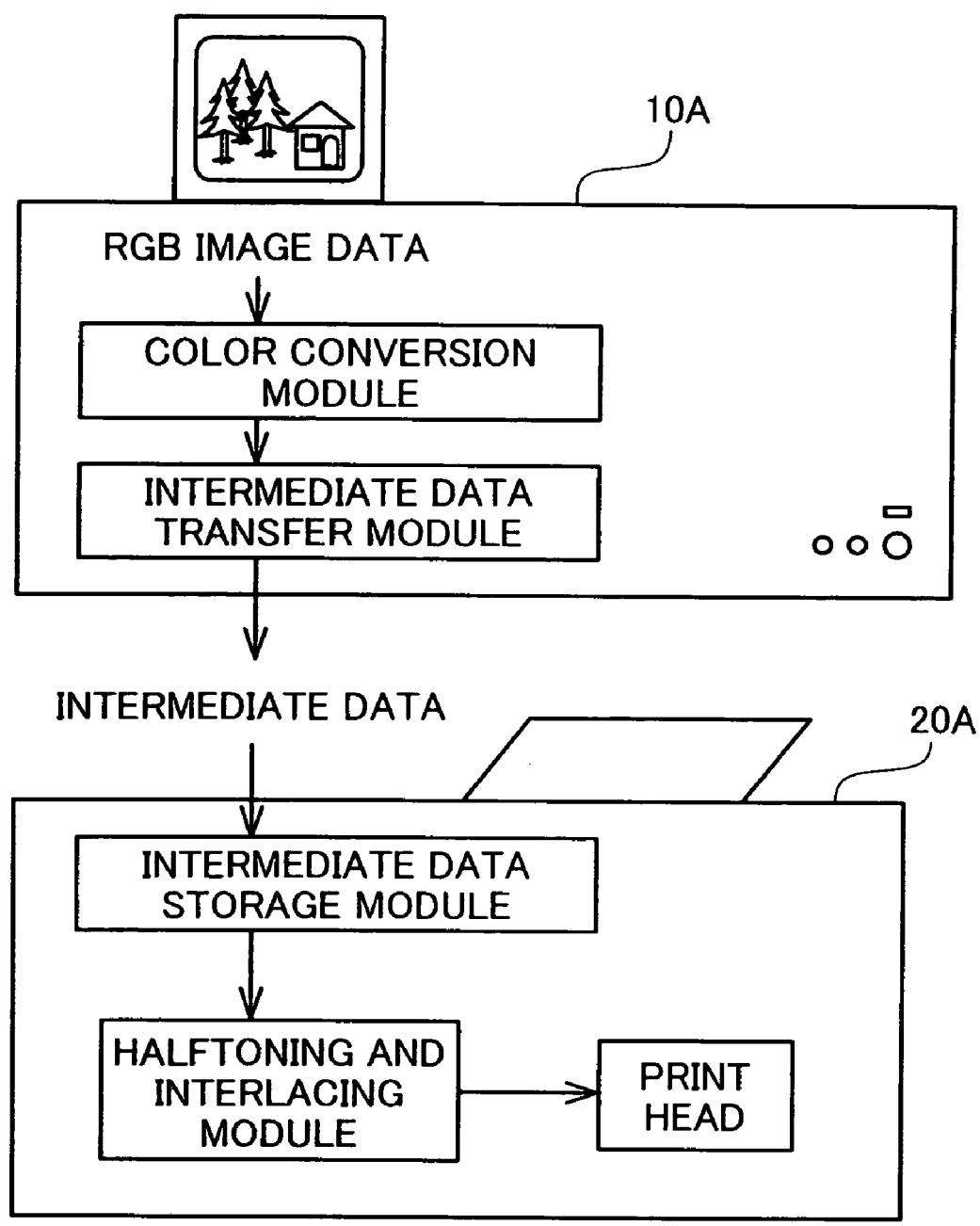
FIGS. 1A and 1B show printing systems in modes of the invention.

Prior to detailed description of embodiments, two modes of carrying out the invention are briefly described for the better understanding. FIG. 1A shows the configuration of a printing system in a first mode of the invention. The printing system includes a computer 10A functioning as an image processing device and a printer 20A functioning as a printing device. Image data are subjected to a preset series of image processing for output of an image generated by the computer 10A from the printer 20A. In the printing system of the first mode, the computer 10A and the printer 20A share the preset series of image processing.

The computer 10A generally expresses an image as RGB image data of three primary colors R, G, and B, whereas the printer 20A prints an image with inks mounted thereon. Conversion of RGB image data into data representing the quantities of the respective inks is thus required to print an image generated by the computer. In the printing system of FIG. 1, a color conversion module included in the computer 10A takes charge of this part of image processing. Namely the computer 10A carries out the color conversion process. The details of the color conversion process will be discussed later. The computer 10A also has an intermediate data transfer module, which functions to transfer intermediate data generated as a result of the image processing by the computer 10A to the printer 20A. In order to shorten the time required for transfer, the intermediate data are transferred in a specific form that requires the printer 20A to expand the transferred intermediate data to multiple pixels.

The intermediate data transferred to the printer 20A are stored in this specific form that requires later expansion into an intermediate data storage module. The printer 20A makes the stored data subjected to a residual series of image processing and supplies resulting data to a print head. The print head creates ink dots on a printing medium according to the supplied resulting data, so as to print an image. The intermediate data transferred from the computer 10A to the printer 20A are not in a dot expressing form to express an image with dots. It is thus required to convert the intermediate data into data in the dot expressing form. The order of dot creation by the print head may not be identical with the storage order of the data in the printer 20A. An additional process may thus be required to rearrange the order of the data. In the printing system shown in FIG. 1, the printer 20A has a halftoning and Interlacing module, which takes charge of such required processing. On completion of the required processing, resulting data are supplied to the print head for printing an image.

As mentioned above, the intermediate data are stored in the specific form that requires the printer 20A to expand the intermediate data to multiple pixels. The halftoning and interlacing module reads the intermediate data corresponding to a target pixel as a processing object, expands the intermediate data, and makes the target pixel subjected to a predetermined series of image processing. On completion of the conversion with regard to one pixel, the halftoning and interlacing module reads the intermediate data corresponding to a next target pixel, expands the intermediate data, and makes the next target pixel subjected to the predetermined series of image processing. This procedure is repeated for all the pixels as the processing object. This arrangement enables most part of the intermediate data to be stored in the non-expanding manner in the printer 20A, while the intermediate data as the processing object is expanded. The printer 20A accordingly does not require a large storage capacity. The storage capacity of the printer 20A thus does not restrict the image processing, so that the computer 10A and the printer 20A can effectively share the required series of image processing.

A2. Mode of Carrying Out the Invention—2

Figure 1B:
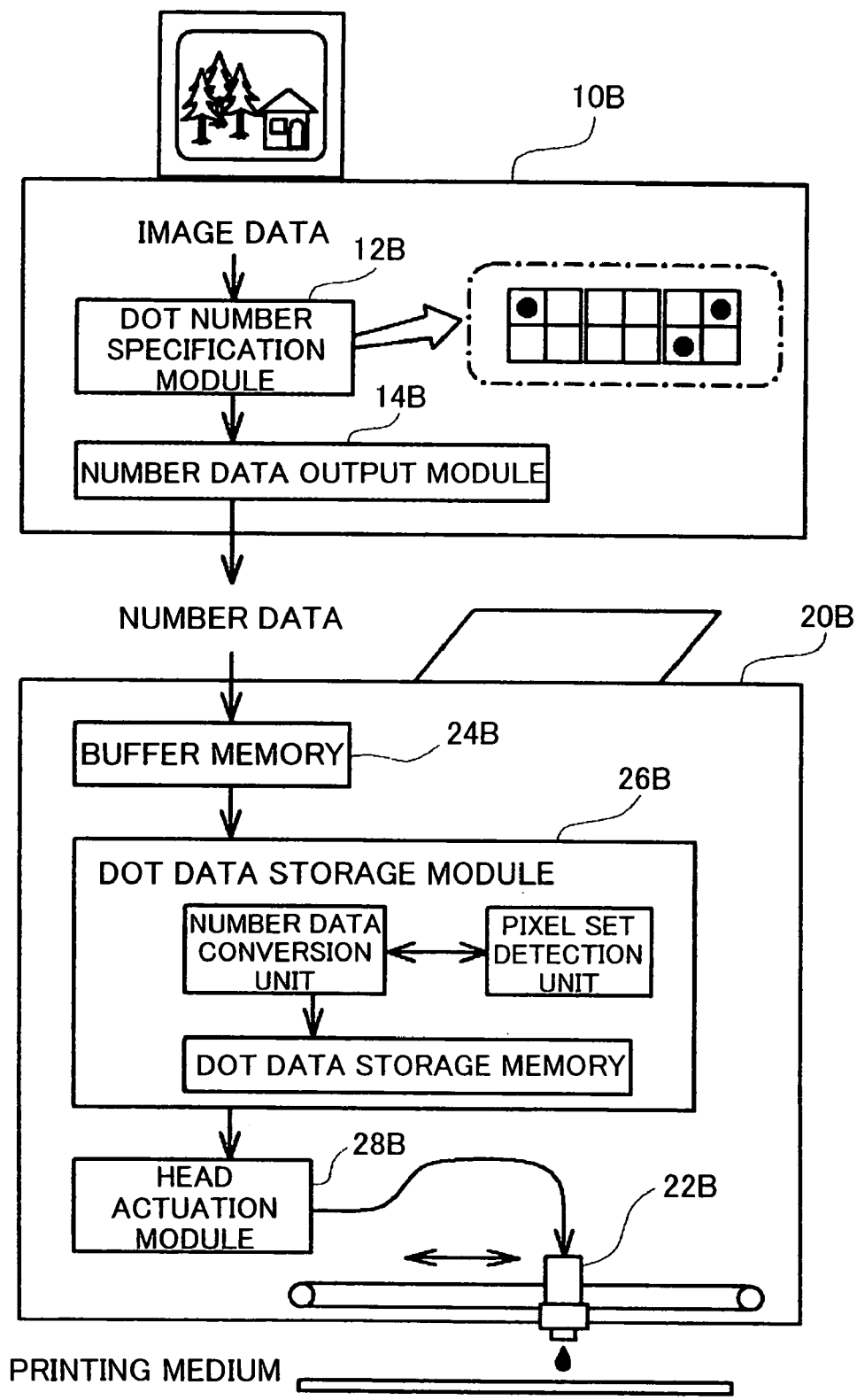

Another mode of carrying out the invention is briefly described with reference to FIG. 1B. The printing system shown in FIG. 1B includes a computer 10B functioning as an image processing device and a printer 20B functioning as a printing device of the invention. A predetermined program is loaded to and executed by the computer 10B, and the computer 10B and the printer 20B integrally function as the printing system. The printer 20B has a head 22B to eject small ink droplets. Adequate ejection of ink droplets from the head 22B onto a printing medium forms ink dots at arbitrary positions on the printing medium. The printer 20B takes advantage of this function and ejects ink droplets on the printing medium while moving the head 22B back and forth, so as to create ink dots in a desired distribution and thereby print a resulting image on the printing medium. Since the printer 20B creates ink dots to print a desired image, a preset series of image processing is required in advance to convert image data into data representing formation and non-formation of dots in respective pixels of the image. The computer 10B, which is separate from the printer 20B, generally takes charge of such image processing. The resulting processed data are supplied from the computer 10B to the printer 20B for printing an image.

In the printing system that uses the computer 10B to execute image processing and supply resulting data to the printer 20B for printing an image, an increase in number of pixels to increase in volume of image data undesirably extends the required time for supply of the data to the printer 20B. This prevents quick printing of an image. The computer 10B included in the printing system of FIG. 1B collects a preset number of pixels into one pixel group, specifies the number of dots to be created in the pixel group, and supplies number data representing the specified number of dots to the printer 20B. A dot number specification module 12B shown in FIG. 1B executes a preset series of image processing of an object image to be printed, so as to specify the numbers of dots to be created in the respective pixel groups.

A frame of one-dot chain line shown in the vicinity of the dot number specification module 12B conceptually shows a process of specifying the numbers of dots to be created in respective dot sets. Each small squire in the frame represents a pixel, and a closed circled in a pixel shows that a dot is to be created in the pixel. The pixels, in which dots are to be created, are determined by applying a known image processing method, such as error diffusion method or dither method, to image data. The dot number specification module 12B shown in FIG. 1B collects two columns and two rows of pixels, that is, four pixels, into one pixel group and specifies the number of dots to be created in the pixel group. For example, in the frame of one-dot chain line, the specified number of dots to be created is 1 in a left most pixel group, 0 in a second left pixel group, and 2 in a right most pixel group. A number data output module 14B outputs the number of dots to be created in each pixel group as number data to the printer 20B. Compared with the structure of outputting the dot on-off state in each pixel, this arrangement of outputting the number of dots to be created in each pixel group desirably reduces the total quantity of data, thus ensuring quick supply of data to the printer 20B.

The printer 20B converts the received number data into dot data representing the dot on-off state in each pixel and drives the head 22B according to the converted dot data, so as to print an image. The printer 20B shown in FIG. 1B does not immediately convert the number data received from the computer 10B into the dot data representing the dot on-off state in each pixel, but once stores the received number data into a buffer memory 24B. The printer 20B successively converts the number data into the dot data representing the dot on-off state in each pixel with the movement of the head 22B, which reciprocates on a printing medium to create dots, and drives the head 22B with the converted dot data to print an image. A dot data storage module 26B converts the number data into the dot data, stores the converted dot data, and supplies the stored dot data to a head actuation module 28B with the reciprocating motions of the head 22B, so as to drive the head 22B and create dots at adequate positions on the printing medium. The dot data storage module 26B has a pixel set detection unit, which detects pixel sets, each consisting of multiple pixels for dot creation, in every reciprocating motion of the head 22B. A number data conversion unit included in the dot data storage module 26B converts the number data into dot data and stores the dot data regarding the respective pixels included in each pixel set into a dot data storage memory. The stored dot data with regard to the respective pixel sets are supplied to the head actuation module 28B to print an image on the printing medium.

In the process of storing the dot data into the dot data storage memory, a plural number of pixel sets, which is smaller than the total number of pixel sets included in each pixel group, are converted into dot data and stored at least once with regard to each pixel group. This arrangement desirably reduces the required storage capacity of the dot data storage memory, compared with the structure of converting all the pixel sets included in each pixel group into dot data. This arrangement requires conversion of the number data into dot data at a greater frequency than the structure of converting all the pixel sets into dot data. But the conversion frequency in this arrangement is still less than the frequency of conversion of the number data into dot data in each reciprocating motion of the head 22B. The arrangement of this mode thus ensures quick printing of an image, while desirably reducing the required storage capacity of the memory mounted on the printer 20B. The printing systems and the printers in these modes are described in detail as preferred embodiments.

The discussion first regards the printing system in one embodiment of the invention.

B. Construction of Device in Embodiment

Figure 2:
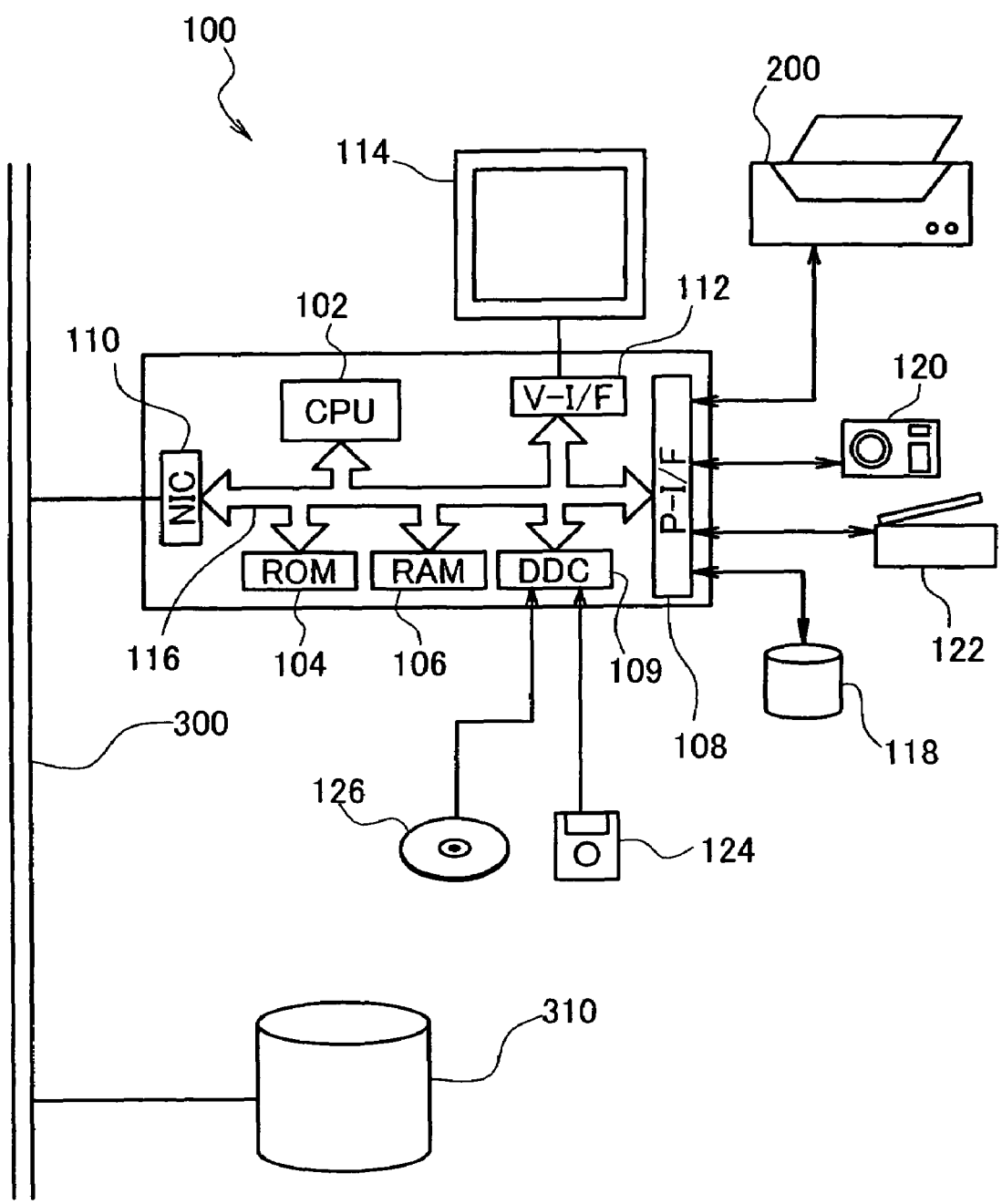
FIG. 2 conceptually illustrates the construction of a computer functioning as an image processing device of an embodiment.

FIG. 2 illustrates the structure of a computer 100 functioning as an image processing device in this embodiment. The computer 100 has a known structure and includes a CPU 102, a ROM 104, and a RAM 106, which are mutually connected via a bus 116. The computer 100 has a disk controller DDC 109 for reading data from a flexible disc 124 and a compact disc 126, a peripheral equipment interface P-I/F 108 for transmitting data to and from peripheral equipment, and a video interface V-I/F 112 for actuating a CRT 114. A hard disk 118 and a color printer 200 discussed later are connected with the P-I/F 108. Connection of a digital camera 120 or a color scanner 122 to the P-I/F 108 enables an image taken from the digital camera 120 or the color scanner 122 to be printed. Attachment of a network interface card NIC 110 to the computer 100 causes the computer 100 to connect with a communication line 300 and obtain data stored in a storage device 310 on the communication line 300.

Figure 3:
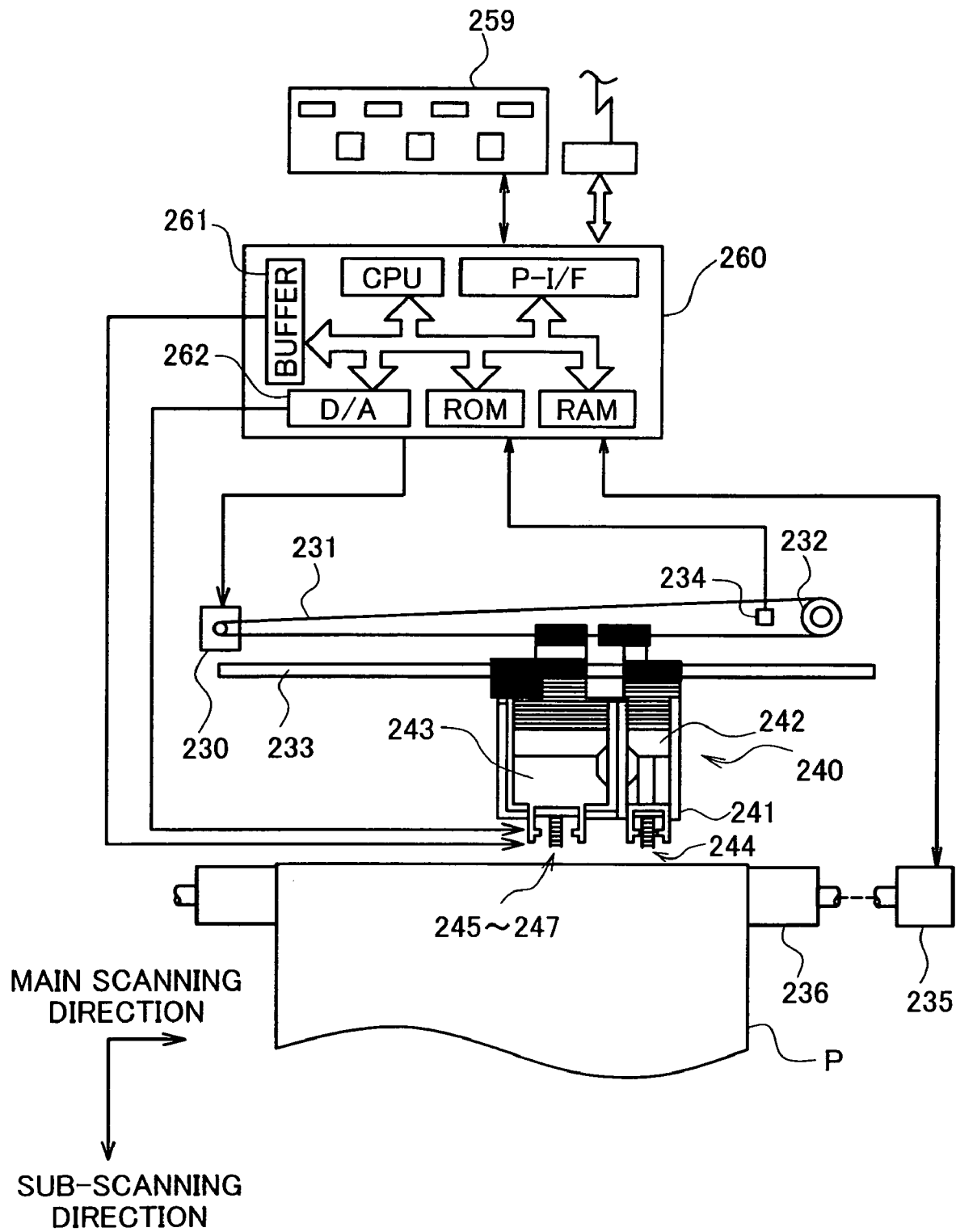
FIG. 3 conceptually illustrates the structure of a printer in the embodiment.

FIG. 3 schematically illustrates the structure of the color printer 200 in the first embodiment. The color printer 200 is an inkjet printer that is capable of creating four color ink dots, cyan, magenta, yellow, and black. The color printer 200 may alternatively be an inkjet printer that is capable of creating six color ink dots including cyan ink having a low dye density (light cyan ink) and magenta ink having a low dye density (light magenta ink), in addition to the above four color inks. In the description below, cyan ink, magenta ink, yellow ink, and black ink are referred to as C ink, M ink, Y ink, and K ink.

As illustrated, the color printer 200 has a mechanism of actuating a print head 241 mounted on a carriage 240 for ink ejection and dot creation, a mechanism of activating a carriage motor 230 to move the carriage 240 back and forth along an axis of a platen 236, a mechanism of activating a paper feed motor 235 to feed printing paper P, and a control circuit 260 that controls dot creation, the motions of the carriage 240, and the feed of the printing paper P.

An ink cartridge 242 for receiving K ink therein and an ink cartridge 243 for receiving C, M, and Y inks therein are mounted on the carriage 240. When the ink cartridges 242 and 243 are attached to the carriage 240, inks in the ink cartridges run through ink conduits (not shown) and are supplied to ink ejection heads 244 through 247 for the respective colors formed on the bottom face of the print head 241. The ink ejection heads 244 through 247 of the respective colors eject ink droplets of the supplied inks to create ink dots on the printing medium.

The control circuit 260 includes a D-A converter 262 that converts digital data into analog signals and a drive buffer 261 that temporarily stores data to be supplied to the print head 241, in addition to a CPU, a ROM, a RAM, and a peripheral equipment interface P-I/F. The control circuit 260 may alternatively have no CPU but actualize these functions by the hardware or firmware construction. The control circuit 260 controls the operations of the carriage motor 230 and the paper feed motor 235 to regulate main scanning motions and sub-scanning motions of the carriage 240. The control circuit 260 also drives the print head 241 at adequate timings corresponding to the main scanning motions and the sub-scanning motions of the carriage 240. The print head 241 is driven, in response to supply of a drive signal from the D-A converter 262 and control data from the drive buffer 261. The mechanism of supplying the drive signal and the control data to eject ink droplets will be discussed later with reference to a drawing. Under the control of the control circuit 260, ink droplets are ejected from the ink ejection heads 244 through 247 of the respective colors at adequate timings to create ink dots and print a color image on the printing paper P.

Any of diverse methods may be applied to eject ink droplets from the ink ejection heads of the respective colors. One applicable method uses piezoelectric elements for ink ejection. Another applicable method uses heaters that are located in ink conduits and are actuated to produce bubbles in the ink conduits for ejection of ink droplets. The technique of this embodiment is not restricted to the ink ejection-type printers but may also be applied to printers that take advantage of thermal transfer to create ink dots on a printing medium and printers that take advantage of static electricity to make respective color toners adhere on a printing medium.

Figure 4:
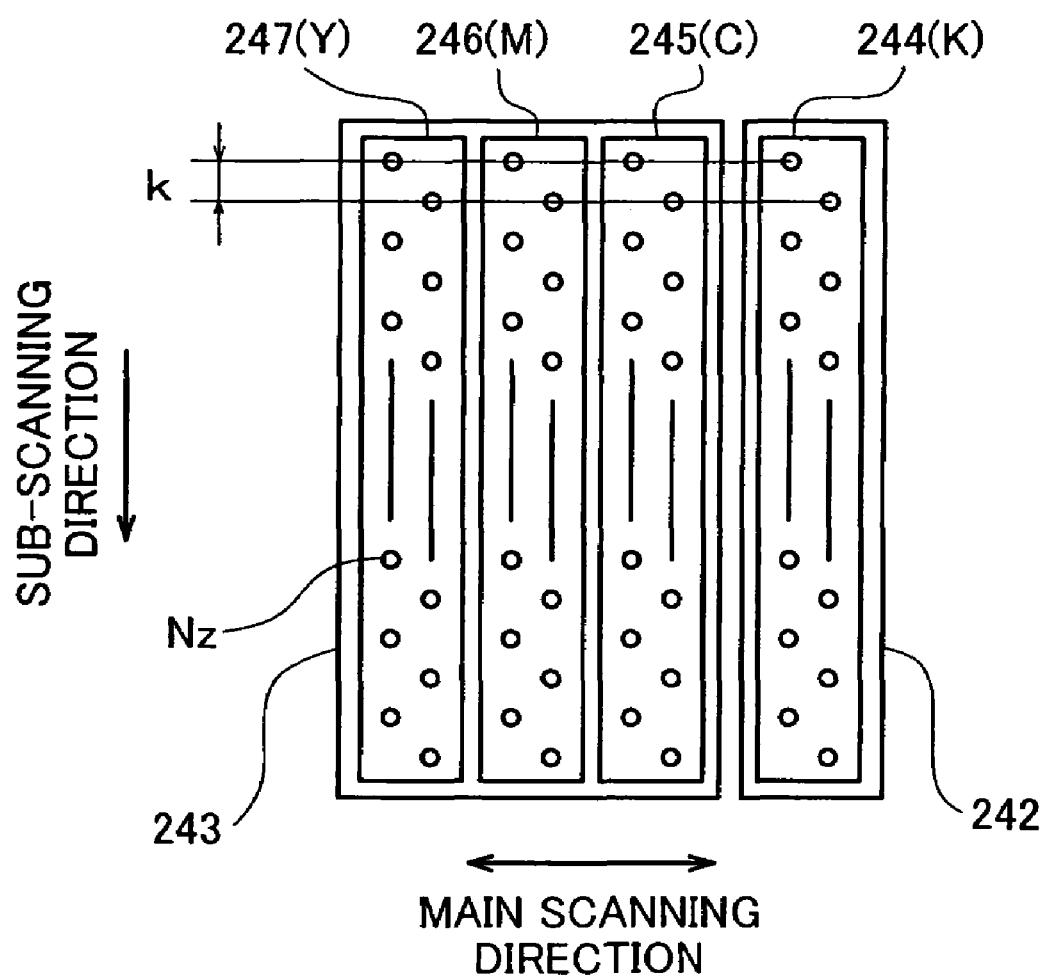
FIG. 4 shows an arrangement of nozzles formed in bottom faces of ink ejection heads.

FIG. 4 shows multiple nozzles for ejecting ink droplets, which are formed on the bottom faces of the ink ejection heads 244 through 247 of the respective colors. As illustrated, four nozzle arrays for ejecting respective color ink droplets are formed on the bottom faces of the ink ejection heads of the respective colors. Each nozzle array includes 48 nozzles Nz, which are arranged in zigzag at intervals of a nozzle pitch k. These nozzles simultaneously eject ink droplets, in response to the drive signal and the control data supplied from the control circuit 260, as discussed below with reference to FIG. 5.

Figure 5:
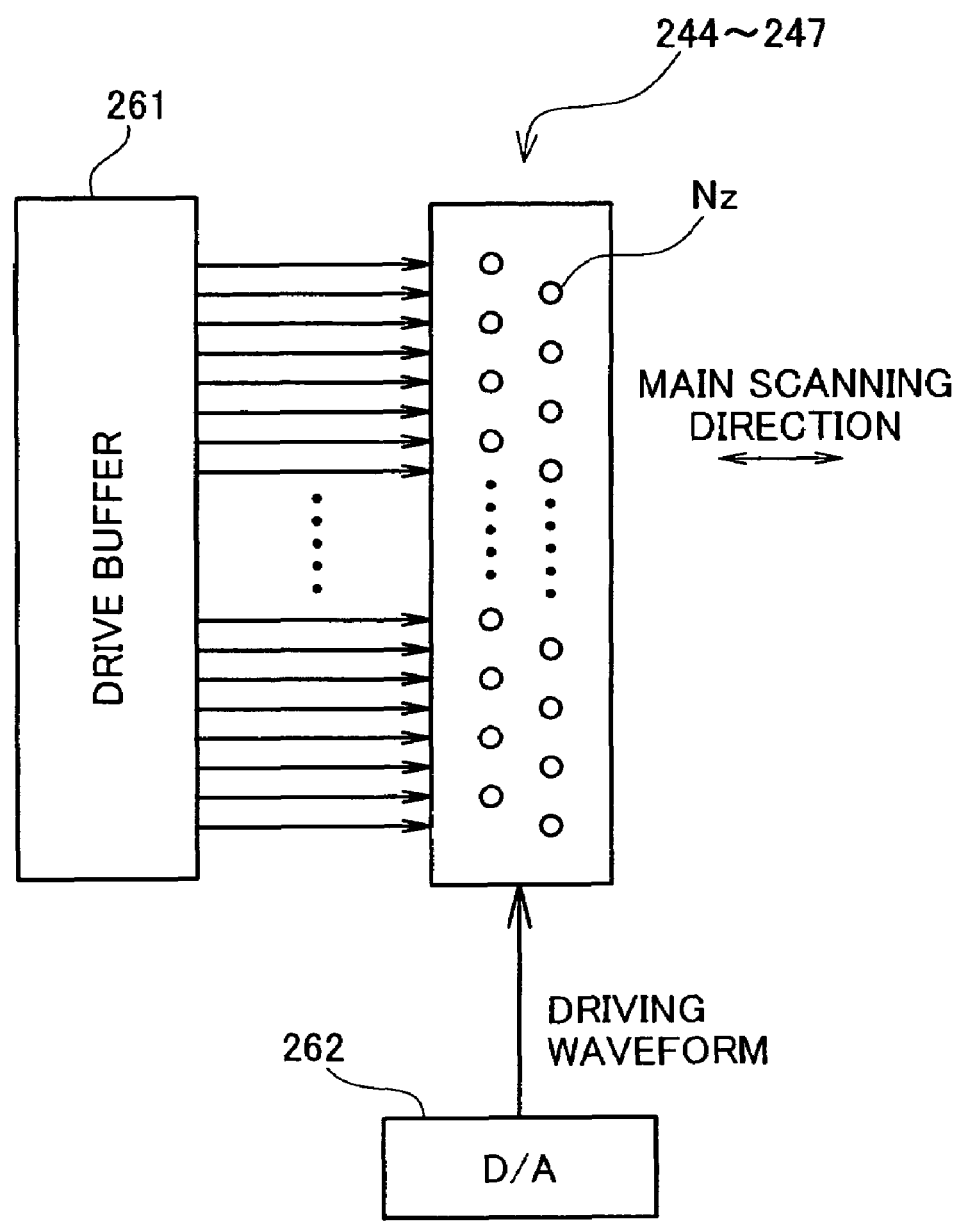
FIG. 5 shows a mechanism of ejecting ink droplets from nozzles under control of a control circuit.

FIG. 5 conceptually shows the ink ejection heads 244 through 247 to eject ink droplets in response to the drive signal and the control data. As shown in FIG. 4, the multiple nozzles Nz are formed in the bottom face of each ink ejection head and are respectively connected with specified areas allocated on the drive buffer 261. The drive signal output from the D-A converter 262 is simultaneously supplied to all the nozzles Nz.

Each of the ink ejection heads 244 through 247 ejects ink droplets in the following manner. The ink ejection head first selects nozzles, which are expected to eject ink droplets, and writes data representing results of the selection in the drive buffer 261. As mentioned above, all the nozzles are respectively related to the specified areas on the drive buffer 261. When a nozzle is selected to eject an ink droplet, data '1' is written in the specified area corresponding to the nozzle. When a nozzle is not selected, data '0' is written in the specified area corresponding to the nozzle. The data written in the drive buffer 261 are output as control data to the ink ejection heads 244 through 247. The D-A converter 262 outputs a drive signal synchronously with output of the control data from the drive buffer 261. The output drive signal is supplied to all the nozzles but drives only the nozzles selected according to the control data. The nozzles that are selected to eject ink droplets and have the setting of the data '1' in the corresponding areas in the drive buffer 261 simultaneously eject ink droplets.

The control circuit 260 shown in FIG. 3 sets the control data for controlling ejection of ink droplets in the drive buffer 261 and successively outputs drive signals synchronously with the main scanning motions and the sub-scanning motions of the carriage 240. Ink droplets are thus formed at adequate positions to print an image on the printing paper P.

C. Outline of Image Processing

Figure 6:
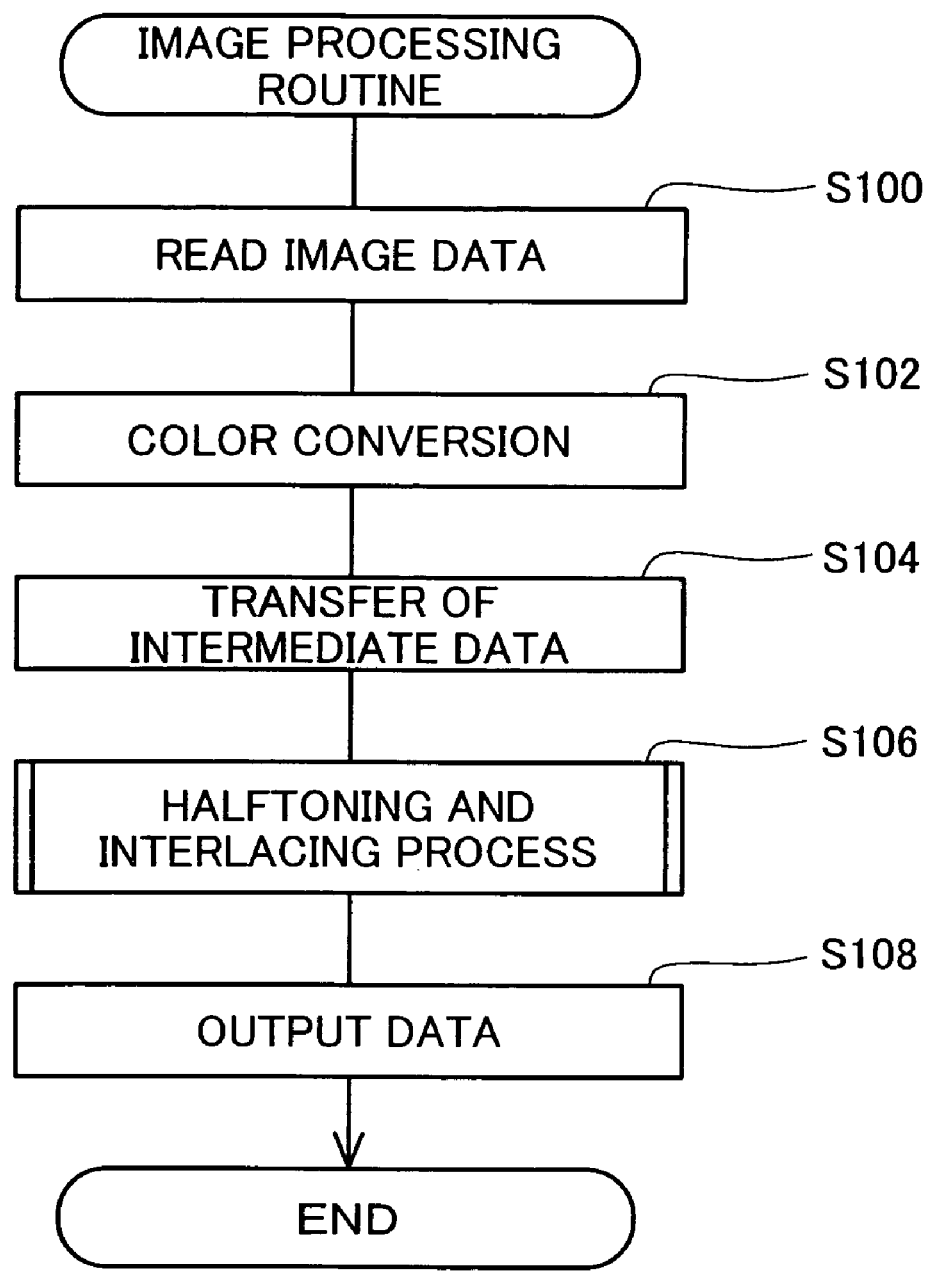
FIG. 6 is a flowchart showing an image processing routine executed in the embodiment.

This embodiment has the hardware structure discussed above and executes a series of image processing discussed below. The control data used for controlling ejection of ink droplets in this embodiment are generated through a preset series of image processing of an object image to be printed. FIG. 6 is a flowchart showing a flow of image processing executed in the printing system of this embodiment. In the structure of this embodiment, the computer 100 and the color printer 200 share this series of image processing. The outline of image processing is described briefly with reference to FIG. 6. This series of image processing corresponds to the mode 1 shown in FIG. 1A.

The image processing routine first reads image data of an object image to be printed (step S100). The image data read here are RGB color image data, that is, image data having 256 tone widths of a tone value 0 to a tone value 255 with respect to R, G, and B colors.

The image processing routine then carries out color conversion of the input image data (step S102). The color conversion process converts RGB color image data expressed by combinations of R, G, and B tone values into image data expressed by combinations of tone values of respective colors used for printing. As mentioned previously, the printer 200 uses four color inks C, M, Y, and K to print an image. The color conversion process of this embodiment thus converts image data expressed by tone values of R, G, and B colors into data expressed by tone values of C, M, Y, and K colors. The color conversion process refers to a three-dimensional numerical table called a color conversion table (LUT). The mapping of the tone values of C, M, Y, and K colors to the RGB color image data is stored in advance in the LUT. The reference to this LUT thus ensures quick color conversion. In this example, the RGB image data having 256 tones are converted into CMY tone data having 256 tones.

After the color conversion process, intermediate data thus generated are transferred to the color printer 200 (step S104). In this embodiment, in order to shorten the required time for transfer, the computer 100 transfers the intermediate data in a state requiring expansion in the color printer 200. The terminology 'state requiring expansion' is described below.

In the printing system of this embodiment, the printing resolution of dot creation on the printing medium by the color printer 200 is set higher than the resolution of an image processed in the computer 100. FIG. 7 shows the settings of resolutions in this embodiment. While the resolution of image data processed in the computer 100 is 720 dpi (720 pixels per inch), the printing resolution of the color printer 200 is set to 1440 dpi (1440 pixels per inch). Each large square on the upper row in FIG. 7 represents a pixel in the resolution of 720 dpi. In the process of converting the resolution into 1440 dpi, each pixel in the resolution of 720 dpi is divided into two in both the vertical and horizontal directions, so that four pixels are generated from one pixel.

The lower row in FIG. 7 conceptually shows division of each pixel into four pixels. A pixel 'a' in the resolution of 720 dpi is divided into four pixels 'a1', 'a2', 'a3', and 'a4' by conversion of the resolution into 1440 dpi. Similarly a pixel 'b' in the resolution of 720 dpi is divided into four pixels 'b1', 'b2', 'b3', and 'b4' by conversion of the resolution into 1440 dpi. In this embodiment, the image data of resulting four pixel pixels in the resolution of 1440 dpi are identical with the image data of each pixel in the resolution of 720 dpi prior to the division. One modified procedure may not simply divide each pixel with identical image data but may perform interpolation between adjoining pixels.

One example of such modification is described with reference to FIG. 7. The image data of the pixels 'a1' and 'b1' are identical with the image data of the pixels 'a' and 'b' prior to the division. The image data of the pixel 'a2' is obtained by interpolating the image data of the pixels 'a' and 'b'. The image data of the pixel 'a3' is obtained by interpolating the image data of the pixel 'a' and the image data of a pixel below the pixel 'a'. The image data of the pixel 'a4' is obtained by interpolating the image data of the pixel 'a' and the image data of a pixel located on the lower right of the pixel 'a'.

Another modified procedure may selectively use the two methods, that is, the simple division of a pixel with identical image data and the interpolation, according to the variation in image data between adjoining pixels (for example, between the pixels 'a' and 'b'). For example, the procedure simply divides a pixel when the absolute value of the variation is not less than a preset level, while carrying out the interpolation when the absolute value of the variation is less than the preset level. It is expected that a part having a large absolute value in variation corresponds to an edge in an image. The procedure applies not the interpolation but the simple division of a pixel to this part, so as to keep the sharp edge. A part having a small absolute value in variation between adjoining pixels, on the other hand, is subject to the interpolation. This causes a smooth variation in tone value of the image data, thus ensuring an image of natural touch.

The 'state requiring expansion' is, for example, the state prior to conversion of the image data in the lower resolution into image data in the higher resolution, that is, the state prior to division of each pixel. In the description above, the higher resolution is twice the lower resolution. This is, however, only illustrative and not restrictive at all. For example, the higher resolution may not be an integral multiple of the lower resolution.

The 'state requiring expansion' may be a compressed state of image data as discussed below. FIG. 8 shows run length compression of image data as one example. The run length compression is a technique of expressing a consecutive part of data having an identical numerical value by the consecutive number of values and the identical numerical value of the consecutive part of the data, thereby implementing compression.

As an example, data shown in FIG. 8(*a*) is subjected to the run length compression. The illustrated data consists of 15 numerical values, where the 3$^{rd}$ to 7$^{th}$ numerical values are consecutively an identical value '21'. Here each numerical value is expressed by 1 byte. The run length compression replaces this consecutive part of data with a compression flag representing the state of compression, the consecutive number of values (five), and the identical numerical value (the numerical value 21). Each residual part of the data with no succession of an identical value is not subject to such compression but has the compression flag representing the state of no compression on the head.

FIG. 8(*b*) shows such rules of conversion in the run length compression. Data of FIG. 8(*c*) are obtained by run length compression of the data shown in FIG. 8(*a*) according to these rules. The 1$^{st}$ numerical value and the 2$^{nd}$ numerical value are '12' and '15' in the original data shown in FIG. 8(*a*). This part is thus not compressed, and a 1-bit compression flag is placed before each numerical value. The compression flag is set equal to '0' to represent the state of no compression. The 3$^{rd}$ to the 7$^{th}$ numerical values are consecutively identical in the original data. This part is thus converted into the compression flag, '5' representing the consecutive number of values, and '21' representing the identical numerical value. The compression flag is set equal to '1' to represent the state of compression. Such conversion compresses 5 bytes of the original data into the 2-byte data and the 1-bit compression flag. In FIG. 8(*c*), the compression flag set to '0' is expressed as blank, while the compression flag set to '1' is filled in black. This conversion compresses 15-byte data of FIG. 8(*a*) into 12-byte data. When the compressed data of FIG. 8(*c*) are transferred, the data are expanded to the data of FIG. 8(*a*).

The 'state requiring expansion' includes the compressed state of image data as described above. The 'state requiring expansion' may be a combined state, that is, a compressed state of image data in a low resolution. The above description regards the run length compression of image data, but this is not restrictive at all. Any other known method may be applied to compression of image data.

At step S104 in the flowchart of FIG. 6, the color-converted image data are transferred in the state requiring expansion to the color printer 200.

The color printer 200 stores the transferred intermediate data in the state requiring expansion and makes the stored intermediate data subjected to a halftoning and interlacing process (step S106). The intermediate data transferred from the computer 100 have gone through the color conversion and been converted into tone data representing the quantities of inks, but still have 256 tones. The color printer 200, on the other hand, takes only the state of 'dot creation' or the state of 'no dot creation'. It is accordingly required to convert the tone data having 256 tones into data expressed by the state of dot creation or the state of no dot creation. This process is generally called halftoning process. Any of diverse methods, such as error diffusion method and dither method, may be applied to the halftoning process.

Because of the reasons discussed below, the ink ejection head does not create dots in the alignment order of pixels. It is accordingly required to rearrange the data expressed by the state of dot creation or the state of no dot creation in the order of actual dot formation. Here this process is called interlacing process. The halftoning and interlacing process at step S106 in the flowchart of FIG. 6 integrally carries out the halftoning process and the interlacing process. The details of the halftoning and interlacing process will be described later. Supplementary explanation of the interlacing process is given here.

As described above with reference to FIG. 4, the nozzles Nz are formed at the intervals of the nozzle pitch k in the bottom faces of the ink ejection heads 244 through 247. The main scan of the ink ejection head and simultaneous ejection of ink droplets from the respective nozzles to form multiple raster lines accordingly cause gaps between adjoining raster lines. The sub-scan is carried out by a preset quantity to fill the gaps between the raster lines. This process is conceptually shown in FIG. 9.

Figure 9:
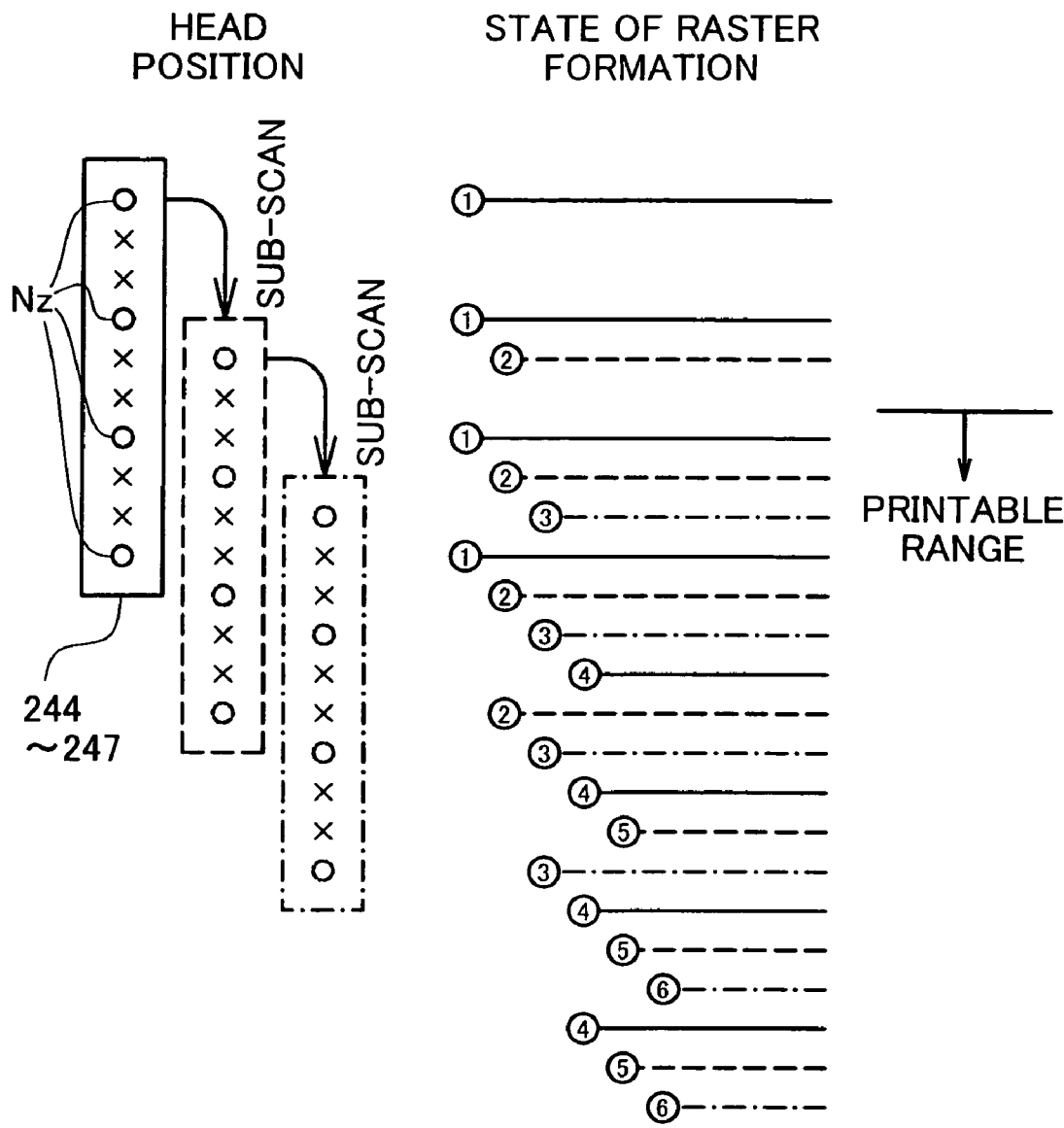
FIG. 9 conceptually shows a interlacing process.

FIG. 9 shows sub-scans of the ink ejection head to fill the gaps between adjoining raster lines. The left side of the drawing shows the sub-scanning position of the ink ejection head, and the right side of the drawing shows formation of raster lines according to the head position. In the actual sub-scan, the printing paper is moved relative to the head. For convenience of explanation, here it is assumed that the head is moved relative to the stationary printing paper. As described previously with reference to FIG. 4, the four ink ejection heads 244 through 247 are mounted in alignment on the print head. Only one ink ejection head is, however, shown in FIG. 9 for the simplicity of illustration. The 48 nozzles are actually formed at the intervals of the nozzle pitch k on the bottom face of the ink ejection head. For the simplicity of illustration, however, only four nozzles Nz are formed at the intervals of a nozzle pitch 3.

The main scan of the head at the top head position shown in FIG. 9 ejects ink droplets from the nozzles Nz to form four raster lines corresponding to the number of the nozzles Nz. The four raster lines formed here are shown by the solid line and are expressed by No. 1. The nozzles are arranged at the intervals of the nozzle pitch 3 in this illustrated example. There is a gap between adjoining raster lines corresponding to this nozzle pitch. The head is thus sub-scanned by a quantity corresponding to 4 raster lines to form other raster lines and fill the gaps as shown by the arrow. The rectangle of broken line in FIG. 9 shows the head position by this sub-scan. The main scan of the head at this head position ejects ink droplets to form four raster lines, which are shown by the broken line and are expressed by No. 2. As shown in FIG. 9, the raster lines shown by the broken line are formed between the raster lines shown by the solid line. There is, however, still a gap between adjoining raster lines. The head is again sub-scanned. The rectangle of one-dot chain line in FIG. 9 shows the head position by this sub-scan. Four raster lines formed at this head position are shown by the one-dot chain line and are expressed by No. 3. As shown in FIG. 9, formation of the raster lines shown by the one-dot chain line fills the gap between adjoining raster lines.

As described above, the nozzles are arranged at the intervals of the nozzle pitch k (3 in the illustrated example of FIG. 9). Each main scan of the head forms a gap between adjoining raster lines corresponding to the nozzle pitch. Sub-scans of the head by an adequate quantity and subsequent (k−1) main scans form raster lines to leave no gap between adjoining raster lines. This method of sub-scan to fill a gap between adjoining raster lines and thereby form raster lines with no gap is called 'interlacing'. When each ink ejection head has N nozzles arranged at intervals of a nozzle pitch k, N and k are set to have no common denominator other than 1 (here N and k are relatively prime to each other). The quantity of sub-scan is N raster lines corresponding to the number of nozzles. In the case of interlacing, the ink ejection head creates dots and forms raster lines in an order different from the alignment order of pixels.

In the illustrated example of FIG. 9, each raster line is formed by one main scan. One raster line may alternatively be formed by multiple main scans. For example, dots in pixels of odd ordinal numbers and dots in pixels of even ordinal numbers may be formed by different main scans. This stabilizes the resulting picture quality, as is known in the art. In the illustrated example of FIG. 9, sub-scan of the head is carried out by a quantity corresponding to four raster lines. Sub-scan of the head by a quantity corresponding to two raster lines causes nozzles to pass through the position of each raster line twice. The first scan, for example, creates dots in the pixels of odd ordinal numbers, and the second scan creates dots in the pixels of even ordinal numbers. Formation of each raster line by multiple main scans is called the 'interlacing' technique. In the case of interlacing, the ink ejection head creates dots in an order different from the alignment order of pixels.

For the enhanced printing speed, dots may be created in both forward and backward passes of the head. Creation of dots in both forward and backward passes is called 'bi-directional printing'. In the case of bi-directional printing, the ink ejection head creates dots in an order different from the alignment order of pixels.

The interlacing process rearranges the halftoning-processed data in the order of actual dot creation by the ink ejection head, according to execution of the interlacing, interlacing, and bi-directional printing. The halftoning and interlacing process of the embodiment at step S106 in the flowchart of FIG. 6 integrally executes the halftoning process and the interlacing process as discussed later.

After the halftoning and interlacing process, the resulting data are output to the drive buffer 261 and are supplied from the drive buffer 261 to the print head 241 according to the motions of the carriage 240 (step S108 in the flowchart of FIG. 6). The mechanism described above with reference to FIG. 5 causes nozzles to simultaneously eject ink droplets and print an image on the printing paper.

As described above, the printing system of the embodiment stores the intermediate data, which is transferred in the state requiring expansion from the color printer 200, in the state requiring expansion. The printing system executes the halftoning and interlacing process (described below) of the intermediate data stored in the state requiring expansion. The image processing executed by the color printer 200 accordingly does not require a large storage capacity. Even the limited storage capacity of the color printer 200 thus does not make any restrictions. The color printer 200 and the computer 100 effectively share the series of image processing, because of the reasons discussed below.

D. Halftoning and Interlacing Process

The following describes the details of the halftoning and interlacing process executed in this embodiment. For the better understanding, the standard interlacing process is explained briefly first.

Figure 10:
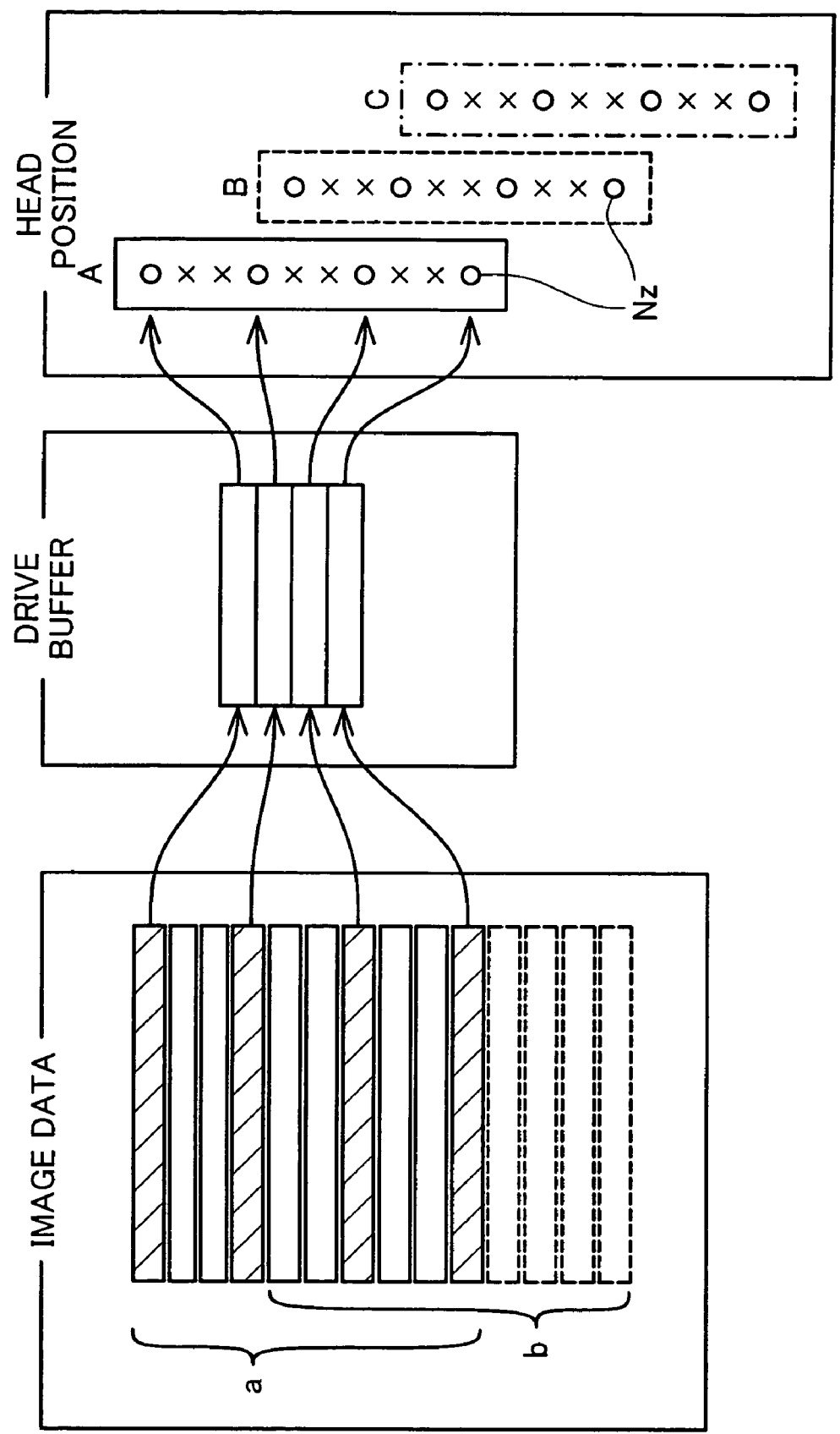
FIG. 10 shows the outline of a conventional interlacing process as a reference.

FIG. 10 conceptually shows a interlacing process of halftoning-processed image data as a reference example. The procedure of the embodiment integrally executes the halftoning process and the interlacing process of the intermediate data stored in the state requiring expansion. The standard interlacing process shown in FIG. 10 as the reference is, however, carried out for the halftoning-processed image data.

The image data, which have gone through the halftoning process to be converted into an expression form representing the state of dot creation or the state of no dot creation in each pixel, are stored in a RAM in a printer. Adequate data are selected among the stored image data in an order of dot creation by nozzles and are transferred to a drive buffer. The data transferred to the drive buffer are supplied as control data to the respective nozzles at adequate timings synchronously with the main scan and the sub-scan of the head. As described previously with reference to FIG. 5, ink droplets are simultaneously ejected from the nozzles according to the control data, so as to print an image. For the simplicity of explanation, it is here assumed that only the interlacing technique is adopted and that neither the interlacing technique nor the bi-directional printing technique is applied.

In the illustrated example of FIG. 10, the head has four nozzles arranged at the intervals of a nozzle pitch 3. The main scan of the head for ink ejection thus simultaneously forms four raster lines, which are apart from each other by a distance corresponding to two raster lines. For the main scan of the head, the image data corresponding to four raster lines mutually apart by two raster lines are selected among the image data stored in the RAM and are transferred to the drive buffer. For example, the main scan of the head at a position A in FIG. 10 selects image data corresponding to four raster lines filled with slant lines among the stored image data and supplies the selected image data to the drive buffer. Until the selected data are output to the drive buffer, at least image data in an area fat including the image data filled with slant lines are to be stored in the RAM of the printer. Similarly for the main scan of the head at a position B, until output of image data of corresponding raster lines to the drive buffer, at least image data in an area 'b' are to be stored in the RAM.

For the simplicity of the illustration, the ink ejection head of FIG. 10 has only four nozzles arranged at the intervals of the nozzle pitch 3. The actual ink ejection head, however, has many more nozzles arranged at the intervals of a nozzle pitch k that is greater than 3. An extremely large quantity of data is thus to be stored in the RAM at least until output of the image data to the drive buffer. The storage capacity of the printer is generally smaller than the storage capacity of the computer. The requirement of such large storage capacity in the printer may prevent the printer and the computer from effectively sharing the series of image processing. The halftoning and interlacing process of the embodiment described below, on the other hand, does not require the printer to have a large storage capacity and thus enables the printer and the computer to effectively share the series of image processing.

Figure 11:
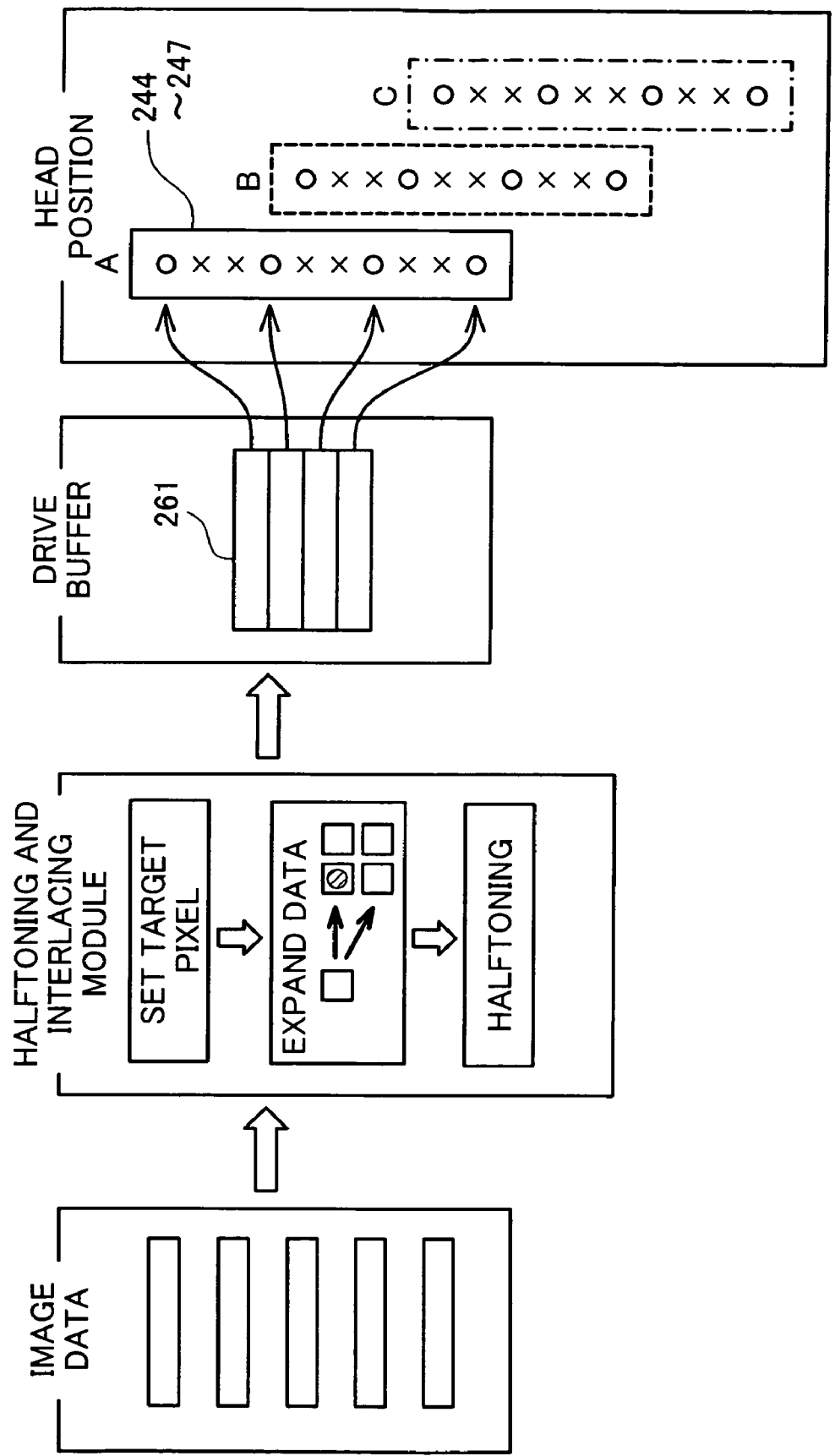
FIG. 11 shows the outline of a halftoning and interlacing process executed in the embodiment.

FIG. 11 shows the outline of the halftoning and interlacing process executed in this embodiment. In the halftoning and interlacing process, data representing raster lines to be formed by nozzles in the main scan are stored once in the drive buffer 261 and are output as control data from the drive buffer 261 to the respective nozzles in the ink ejection head. The halftoning and interlacing process is executed by a halftoning and interlacing module constructed in the control circuit 260 of the color printer 200. This module first sets an object pixel, for which data are to be transferred to the drive buffer 261, as a target pixel. The module subsequently reads corresponding intermediate data among the intermediate data stored in the state requiring expansion in the RAM, expands the corresponding intermediate data, and specifies the dot on-off state in the target pixel, based on the expanded data. The halftoning operation specifies the dot on-off state in each pixel, based on image data. In the illustrated example of FIG. 11, the image data transferred at a resolution of 720 dpi are expanded to data at a resolution of 1440 dpi, prior to printing. The halftoning and interlacing module thus expands image data corresponding to one pixel stored in the RAM into image data corresponding to four pixels. A pixel with a slanted circle among the four expanded pixels in the module represents a target pixel.

Figure 12:
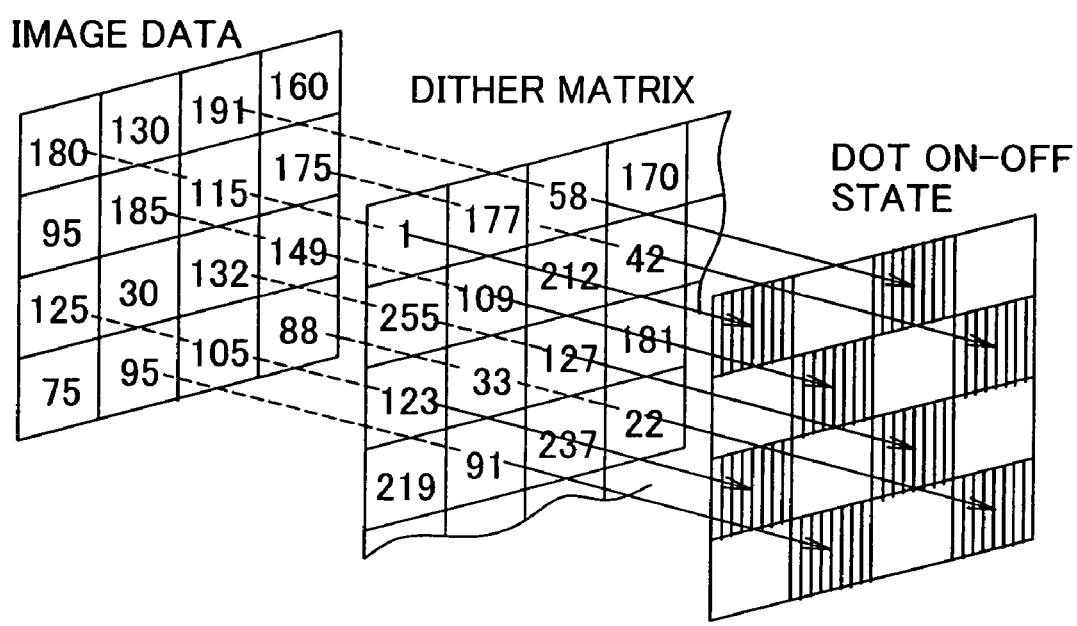
FIG. 12 conceptually shows the principle of specifying the dot on-off state by dither method.

The dither method, for example, may be applied to specify the dot on-off state. As shown in FIG. 12, the dither method compares the image data of each target pixel with a threshold value set at a corresponding position in a dither matrix. When the image data is greater than the threshold value, the method specifies a dot-on state in the target pixel. When the image data is smaller than the threshold value, on the other hand, the method specifies a dot-off state in the target pixel. This technique enables the dot on-off state of each target pixel to be specified immediately after expansion of the image data including the target pixel.

After specifying the dot on-off state in the target pixel, the module stores the result of the specification in the drive buffer 261. On completion of the processing with regard to one target pixel, the module sets a new pixel as a next target pixel, executes the above series of processing, and stores the result of the specification of the dot on-off state in the drive buffer 261. When all the data representing raster lines formed by one man scan of the head are stored in the drive buffer 261 through the repetition of the above processing, the drive buffer 261 outputs the control data to the ink ejection head to eject ink droplets in the main scan of the carriage 240.

In the halftoning and interlacing process described above, it is required to store at least image data including those representing raster lines formed by one main scan, in the RAM. The halftoning and interlacing process of this embodiment reads data of each target pixel, expands the data, and integrally carries out the halftoning process and the interlacing process. The image data can thus be stored in the state requiring expansion in the RAM. Even the color printer 200 having no large storage capacity can thus efficiently execute the halftoning and interlacing process.

Figure 13:
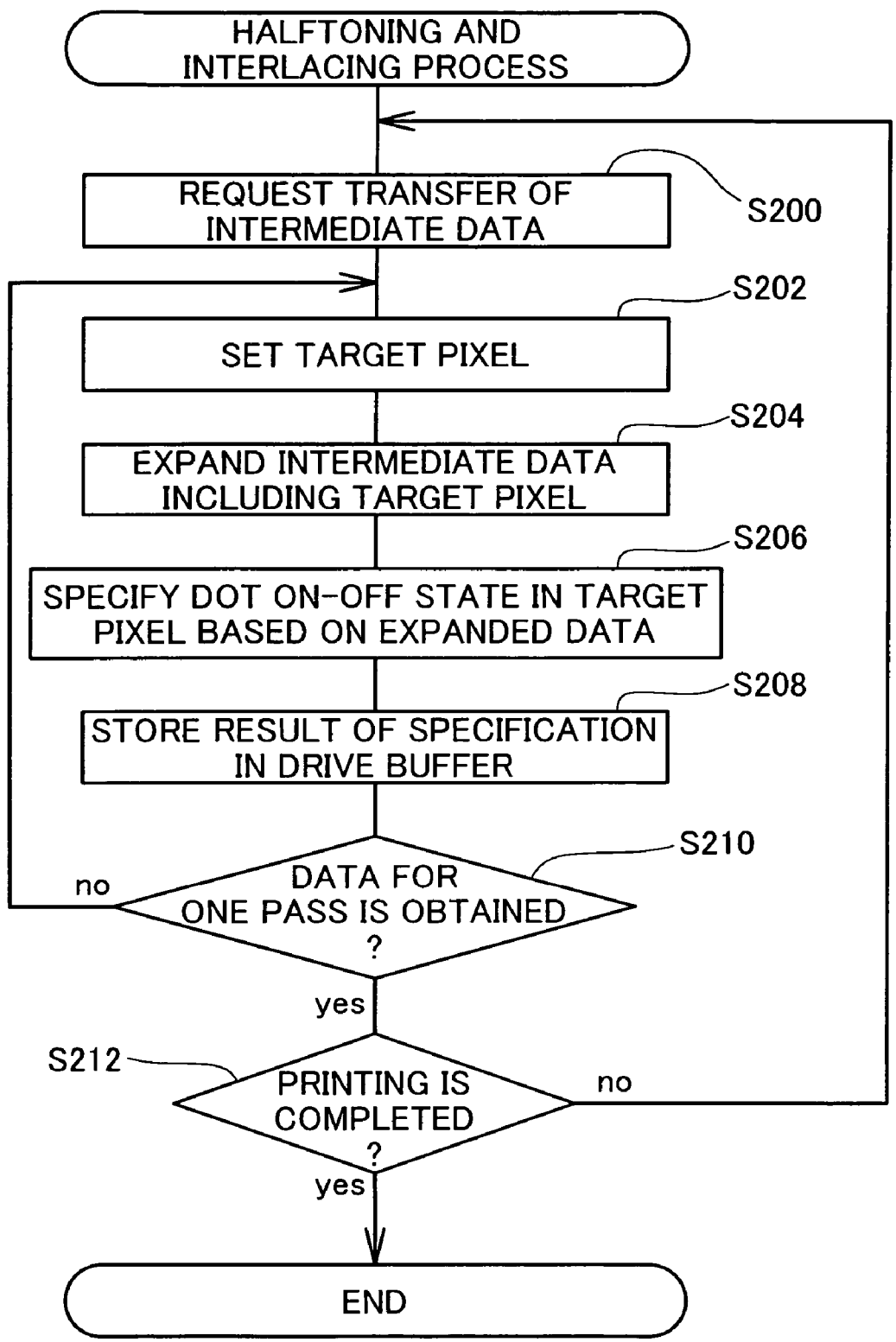
FIG. 13 is a flowchart showing a flow of the halftone and interlacing process of the embodiment.

FIG. 13 is a flowchart showing a flow of the halftoning and interlacing process described above. This processing flow is executed by the control circuit 260 in the color printer 200. The processing flow is concretely described according to this flowchart.

When the processing flow starts, the control circuit 260 first requests the computer 100 to transfer a preset quantity of intermediate data (step S200). As described previously with reference to FIG. 6, in this embodiment, the computer 100 has completed the image processing up to color conversion. The computer 100 thus transfers the color-converted image data in the state requiring expansion. The processing of step S200 stores the transferred intermediate data in the state requiring expansion into the RAM. The transferred intermediate data may be stored into the RAM without any processing or with some pre-processing.

The control circuit 260 then sets a target pixel (step S202). Here the target pixel represents an object pixel, for which the dot on-off state is to be specified and the result of the specification is to be written into the drive buffer 261. The color printer 200 carries out printing in an adequate combination of interlacing, interlacing, and bi-directional printing, according to the printing conditions of each image. The order of dot creation by the respective nozzles Nz in the ink ejection head is thus varied according to the printing conditions. The processing of step S202 sets a target pixel by taking into account the order of dot creation by the nozzles Nz according to the printing conditions.

The control circuit 260 reads out intermediate data including the target pixel and expands the intermediate data (step S204). This step may read out data representing the whole raster line including the target pixel or may read out data representing only the target pixel.

For example, an origin is set at the upper left corner in an object image to be printed, and a target pixel is a pixel of an Nth row and an Mth column. When the intermediate data transferred from the computer 100 have gone through the run length compression, the procedure may read out and expand the intermediate data on the Nth row. The procedure may otherwise analyze the intermediate data on the Nth row and read out only a portion including the pixel on the Mth column. As another example, when the intermediate data at the resolution of 720 dpi are to be converted into data at the resolution of 1440 dpi for printing, the procedure may read out data representing the whole {int(N/4)+1}-th raster line among the intermediate data or may read out data representing only a pixel of {int(N/4)+1}-th row and [int(M/4)+1]-th column among the intermediate data. Here int(N) is an operator that rounds down decimal places of N and takes only the integral part of N. The processing of step S204 expands the transferred and stored intermediate data to the level of pixels actually printed by the color printer 200.

The control circuit 260 specifies the dot on-off state in the target pixel, based on the expanded data (step S206). In this embodiment, the dither method is applied to specify the dot on-off state in the target pixel. The concrete procedure compares the image data of the target pixel in the expanded data with a threshold value set at a position corresponding to the target pixel in a dither matrix. When the image data is greater than the threshold value, the procedure specifies creation of a dot in the target pixel. When the image data is smaller than the threshold value, on the other hand, the procedure specifies creation of no dot in the target pixel.

After specifying the dot on-off state in the target pixel, the control circuit 260 writes the result of the specification at a corresponding area in the drive buffer 261 (step S208). As described previously with reference to FIG. 5, areas in the drive buffer 261 are exclusively allocated to the respective nozzles. The result of the specification of the dot on-off state is thus stored in the area allocated to the nozzle corresponding to the target pixel.

On completion of the processing with regard to one target pixel, the control circuit 260 determines whether data representing the result of specification with regard to all the pixels to be formed in one main scan of the carriage 240 have been stored in the drive buffer 261 (step S210). When all the data for one pass have not yet been stored (step S210: No), the control circuit 260 returns the processing to step S202 to set a new target pixel and repeat the above series of processing.

Repetition of the series of processing implements storage of all the data for one pass (step S210: Yes). As explained previously with reference to FIG. 6, the stored data are output as control data to the ink ejection head. The control circuit 260 subsequently determines whether printing has been completed (step S212). When printing has not yet been completed (step S216: No), the control circuit 260 returns the processing to step S200 to request the computer 100 to transfer a new set of intermediate data. When it is determined that printing has been completed (step S216: Yes), the control circuit 260 exits from the halftoning and interlacing process shown in FIG. 13 and goes back to the image processing routine shown in FIG. 6.

After return from the halftoning and interlacing process, the image processing routine of FIG. 6 outputs the data stored in the drive buffer 261 as control data in synchronism with the motion of the carriage 240. An image is accordingly printed on the printing medium.

As described above, in the image processing of this embodiment, the intermediate data received in the state requiring expansion from the computer 100 are stored in the state requiring expansion. The procedure of this embodiment reads out intermediate data including each target pixel, specifies the dot on-off state in the target pixel, and stores the result of the specification in the drive buffer 261. Even the color printer 200 having no large storage capacity can thus effectively execute the halftoning process and the interlacing process. The computer 100 and the color printer 200 can thus effectively share the series of image processing without restriction of the limited storage capacity of the color printer 200.

E. Modification

Figure 14:
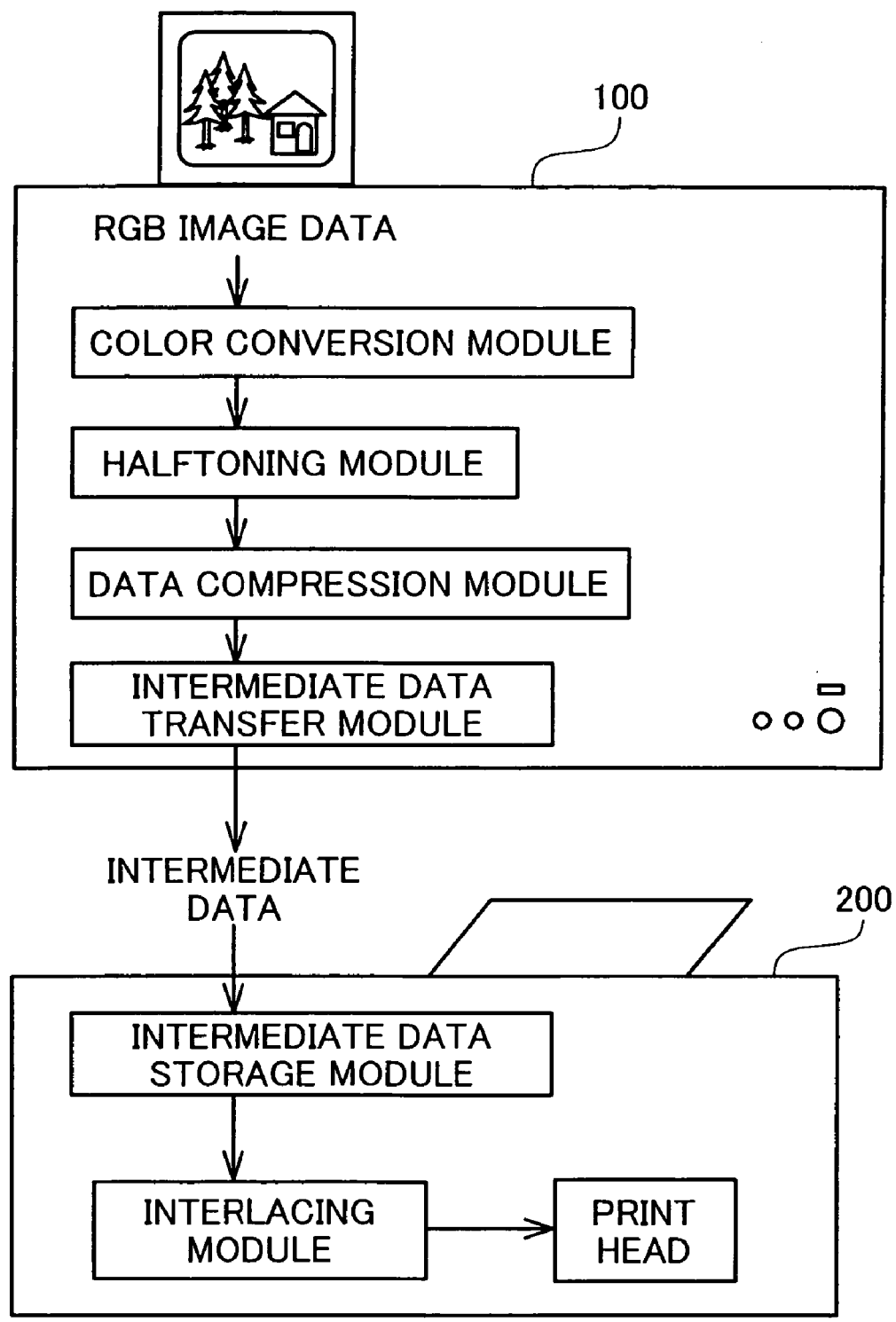
FIG. 14 shows a printing system in one modified example.

In the embodiment described above, the computer 100 executes the image processing up to color conversion, and the color printer 200 executes the halftoning process and the subsequent image processing. The share of the image processing is, however, not restricted to this arrangement. FIG. 14 conceptually shows one modified example.

In the modified example of FIG. 14, the computer 100 executes the color conversion and the halftoning process. The halftoning process is not restricted to the dither method described above, but any of other diverse methods may be adopted for halftoning. The processing power of the computer 100 is generally higher than the processing power of the color printer 200. The computer 100 thus ensures the high-speed halftoning even by the error diffusion method that gives the high picture quality but requires the higher processing power. After the halftoning process, the image data are compressed by, for example, run length compression and are transferred to the color printer 200.

The color printer 200 stores the transferred intermediate data in the state requiring expansion and carries out the interlacing process of the stored intermediate data. The procedure sets a target pixel, expands intermediate data including the target pixel, and stores the expanded data with regard to the target pixel in the drive buffer. The procedure of this modified example does not require the color printer 200 to have a large storage capacity. The color printer 200 and the computer 100 can thus effectively share the series of image processing.

A software program (application program) that actualizes the above functions may be supplied to a main memory or an external storage device of a computer system via a communication line and executed by the computer system. The software program may be read from a CD-ROM or a flexible disk and executed.

In the embodiment described above, dots of a fixed size are created on the printing paper. The technique of the embodiment may be applied to a printer that regulates the size of dots formed on printing paper, like a variable dot printer.

In the embodiment discussed above, the conversion of image data is executed by the computer. The conversion of image data may partly or wholly executed by the printer or an exclusive image processing device.

F. Outline of Image Processing in Second Embodiment

Figure 15:
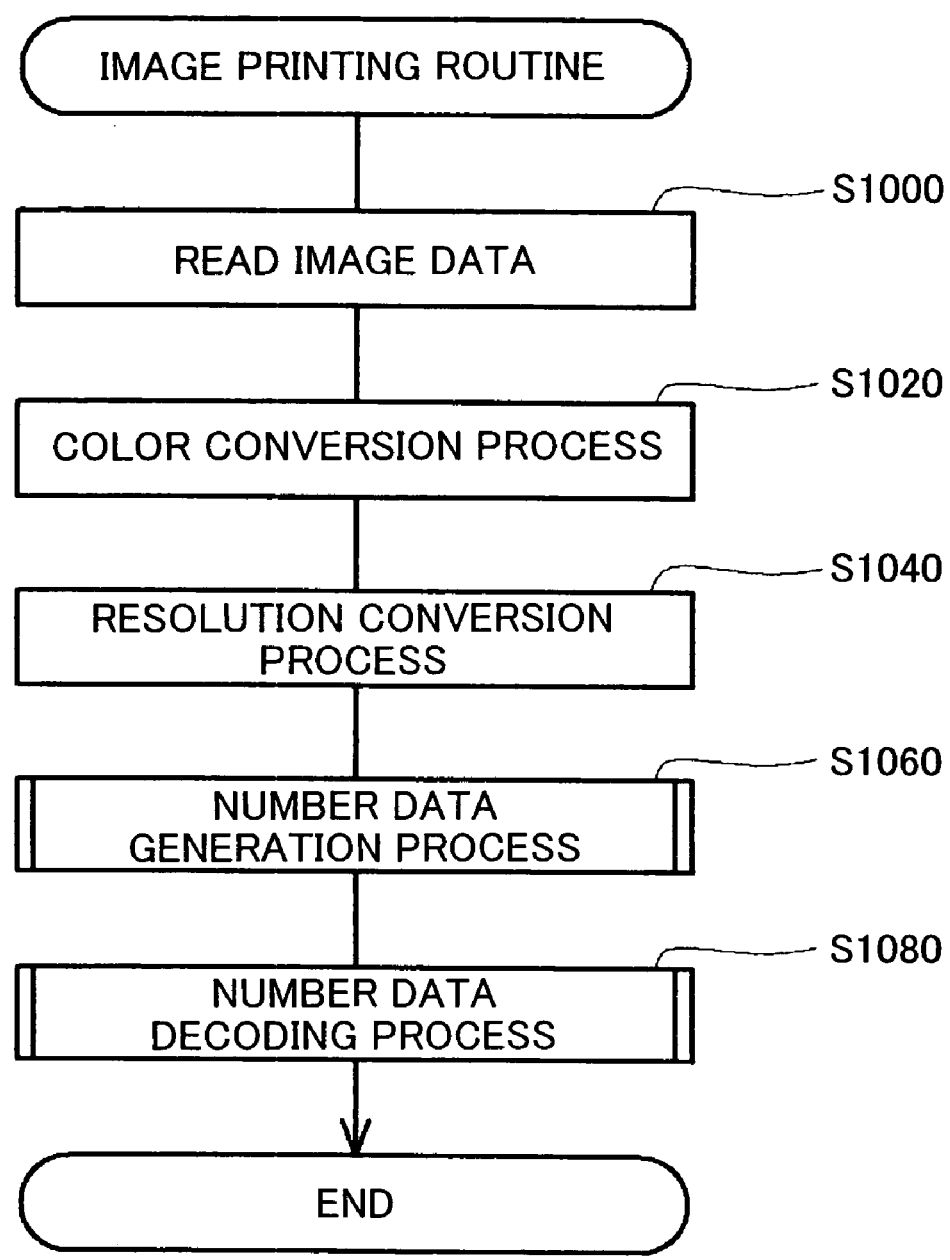
FIG. 15 is a flowchart showing a process of generating control data and printing an image (image printing routine) executed in a second embodiment.

A second embodiment of the invention is described below. The printing system of the second embodiment corresponds to the mode shown in FIG. 1B and has the hardware construction identical with that of the first embodiment. In the second embodiment, the control data used for controlling ejection of ink droplets are generated by a series of image processing of an object image to be printed. FIG. 15 is a flowchart showing a process of generating control data and printing an image (image printing process). As described below, in this embodiment, the first half of the image printing process is executed by the CPU built in the computer 100, while the latter half of the image printing process is executed by the CPU built in the control circuit 260 of the printer 200. The outline of the image printing process is described below according to the flowchart of FIG. 15.

When the image printing process starts, the computer 100 first reads object image data to be converted (step S1000) and executes color conversion of the object image data (step S1020). The image data reading process and the color conversion process are similar to those of the first embodiment and are thus not specifically described here.

On completion of the color conversion, the computer 100 executes resolution conversion (step S104). The resolution conversion process converts the resolution of image data into a resolution printable by the printer 200 (printing resolution). The effective procedure for the enhanced printing quality reduces the size of each pixel and heightens the printing resolution. The enhanced printing resolution, however, does not require an increase in resolution of original image data. In the case of creating dots to print an image, each pixel takes only one of the two states, a dot-on state or a dot-off state. Some of the dot printers may vary the size of dots or vary the density of ink used for dot creation, thus enabling expression of the greater number of states. Even such a dot printer has only several tone numbers expressible in each pixel. The input image data of even 1 byte, on the other hand, enable expression of 256 tones. Since the expressible tone number in each pixel is significantly different, setting the higher printing resolution than the resolution of the input image data enhances the printing quality. Because of this reason, the resolution of the image data is converted into the higher printing resolution at step S1040 in the flowchart of FIG. 15.

FIGS. 16A and 16B show an example of the resolution conversion executed in the first embodiment. As described previously, the color conversion gives image data of the respective colors C, M, Y, and K. The processing described below is applied to the image data of any of these colors. For the simplicity of explanation, the color is not specified in the following discussion.

FIG. 16A shows part of the color-converted image data. Each of multiple rectangles in FIG. 16A represents a pixel, and a numerical value in each rectangle shows a tone value allocated to each pixel. The image data have tone values allocated to the respective pixels arranged in lattice. An available method of heightening the resolution of the image data executes interpolation to form new pixels between existing pixels. The simplest method adopted in this embodiment divides one pixel into multiple smaller pixels to attain the resolution conversion.

FIG. 16B shows the conversion of resolution by division of pixels. In the illustrated example, each pixel is divided into four in the main scanning direction (in the horizontal direction in the drawing) and into two in the sub-scanning direction (in the vertical direction in the drawing). One pixel is accordingly divided into 8 pixels. The broken lines in FIG. 16B show division of pixels. The tone value identical with the tone value of the original pixel prior to division is allocated to each of the small pixel divisions. This series of processing converts the resolution of the image data into the 4-fold resolution in the main scanning direction and into the 2-fold resolution in the sub-scanning direction. The increase rate of the resolution is set arbitrarily according to the requirements.

After the conversion of the resolution of the image data into the printing resolution, the computer 100 starts a number data generation process (step S1060 in the flowchart of FIG. 15).

The number data generation process is described briefly. The color-converted image data is the tone data having the tone values allocated to the respective pixels. The printer 200 creates dots in pixels at adequate densities according to the tone values of the image data, so as to print an image. The tone data converted to the data representing the dot on-off state in the respective pixels are thus to be transferred to the printer 200. The simple transfer of the data representing the dot on-off state in the unit of pixels to the printer 200 undesirably increases the transfer time with an increase in number of pixels. This prevents quick printing of an image. The image printing process of the embodiment thus collects a preset number of multiple pixels into one pixel group and transfers dot number data representing the number of dots to be created in the pixel group to the printer 200. The dot number data representing the number of dots to be created in one pixel group are obtained by converting the image data into the data representing the dot on-off state in each pixel and collecting multiple pixels into one pixel group. The dot number data may alternatively be obtained by collecting multiple pixels into one pixel group and then specifying the number of dots to be created in the respective pixels in the pixel group. The number data generation process at step S1060 generates the dot number data (the number data) representing the number of dots to be created in the pixel group and transfers the generated number data to the printer 20. The details of the number data generation process will be discussed later.

The CPU built in the control circuit 260 of the printer 200 receives the number data output from the computer 100 and starts a number data decoding process (step S1080). The number data decoding process is described briefly. The printer 200 prints an image, based on the data representing the dot on-off state in each pixel, as described previously. The computer 100 of the embodiment outputs the number data representing the number of dots to be created in each pixel group, instead of the data representing the dot on-off state in each pixel. It is accordingly required to convert the number data into the data representing the dot on-off state in each pixel. In the specification hereof, the data representing the dot on-off state in each pixel is called dot data. The method of converting number data into dot data will be described later. The dot data thus obtained are output as control data from the drive buffer 261 in synchronism with the main scans of the ink ejection heads 244 through 247, so as to eject ink droplets and print an image on the printing medium. The number data decoding process converts the number data into dot data and outputs the dot data as control data from the drive buffer 261 in synchronism with the main scans of the ink ejection heads 244 through 247. As described later in detail, the number data decoding process of the embodiment does not simultaneously convert all the number data in the respective pixel groups to store all the dot data. But the number data decoding process of the embodiment takes into account the forward and backward scans of the head to convert the number data in multiple divisions and store the dot data. This arrangement desirably reduces the required memory capacity of the printer 200, while ensuring quick conversion of number data into dot data and quick printing of an image.

For convenience of explanation, the description first regards the number data generation process and then the number data decoding process. The reason why the number data decoding process reduces the required memory capacity of the printer 200 will also be discussed.

G. Number Data Generation Process

Figure 17:
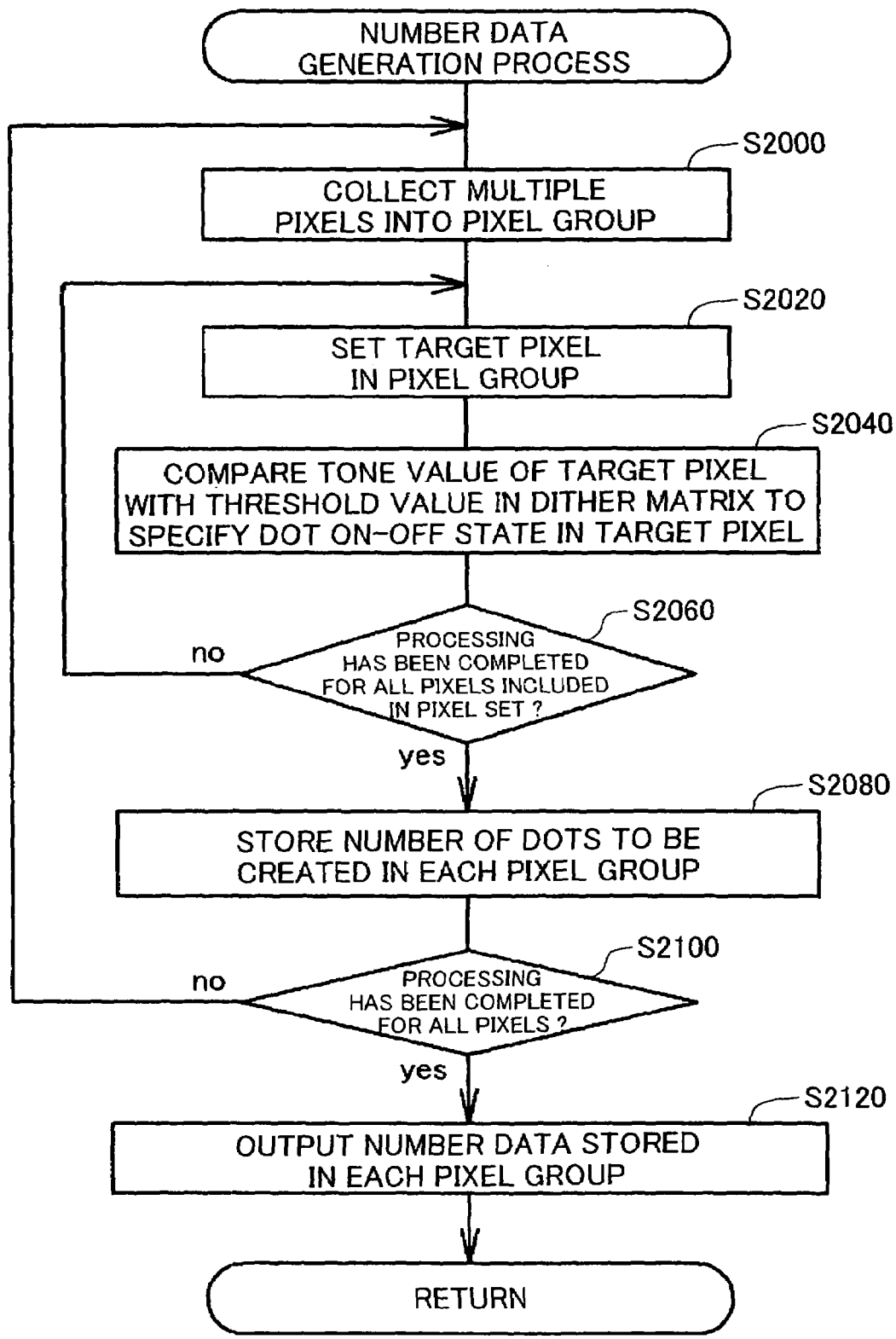
FIG. 17 is a flowchart showing a flow of number data generation process.

FIG. 17 is a flowchart showing a flow of the number data generation process. The number data generation process is described according to the flowchart.

The number data generation process first collects a preset number of multiple pixels into one pixel group (step S2000). The resolution conversion process divides one pixel into eight small pixels. As an example, the eight small pixels obtained by dividing one pixel are thus collected into one pixel group. For example, the pixel at the upper left corner in FIG. 16A is divided into 2 in the vertical direction and into 4 in the horizontal direction, thereby into 8 small pixels as shown in the upper left corner of FIG. 16B. The processing of step S2000 thus collects these eight pixels into one pixel group. The pixels collected into one pixel group may not be mutually adjoining pixels, but pixels having any preset positional relation may be collected into one pixel group.

When small pixels obtained by dividing one pixel are collected into one pixel group, the resolution conversion process may be omitted from the image printing routine of FIG. 15. In this case, the term 'pixel group' in the following description may be adequately replaced.

The number data generation process then sets one object pixel, for which the dot on-off state is to be specified (target pixel), among the pixels collected into one pixel group (step S2020). The process subsequently compares the tone value allocated to the target pixel with a threshold value in a dither matrix and thereby specifies the dot on-off state in the target pixel (step S2040). Here the dither matrix is a two-dimensional numerical table including multiple threshold values arranged in lattice. The process of specifying the dot on-off state according to the dither matrix is described with reference to FIGS. 18 and 19.

Figure 18:
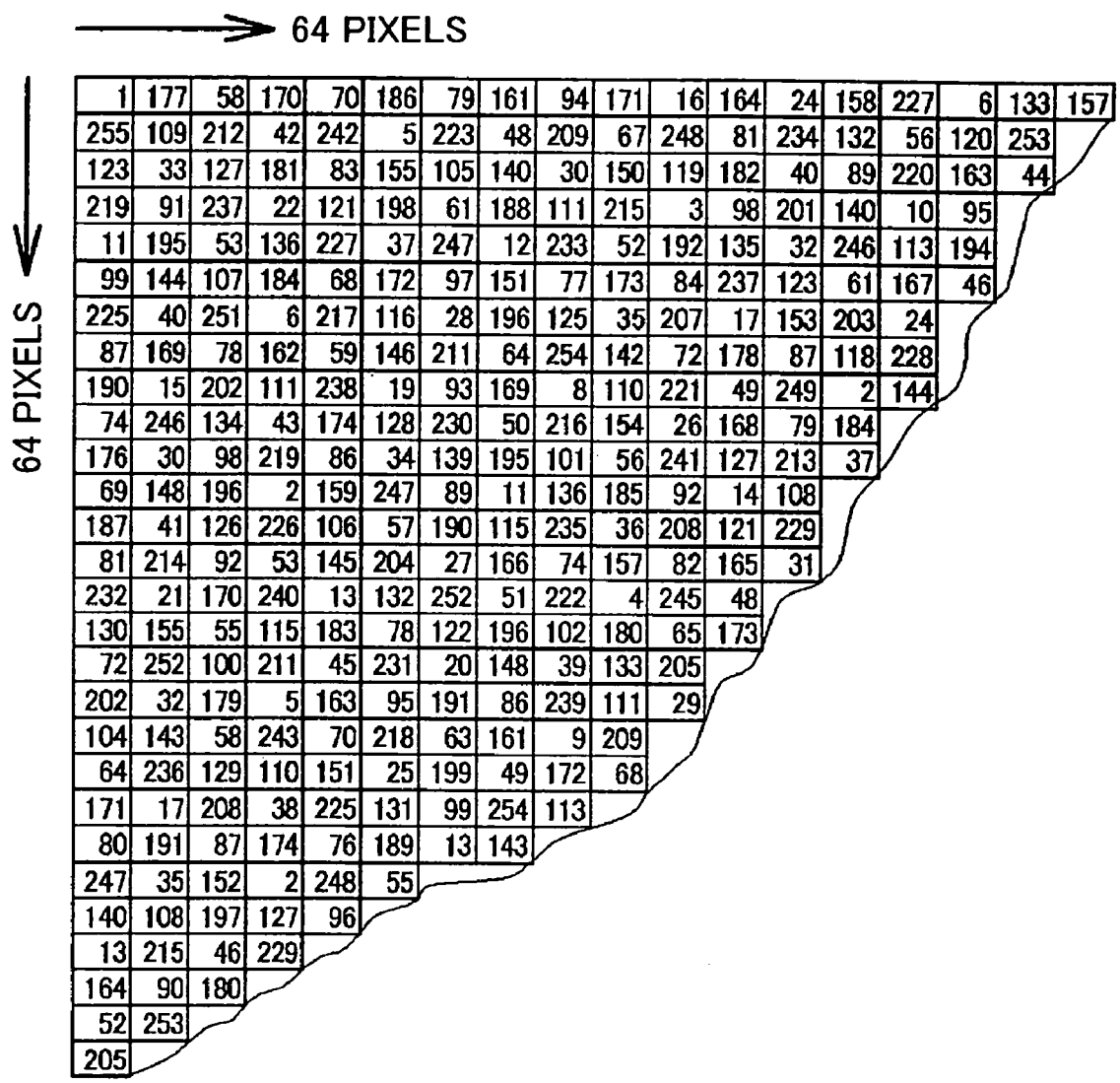
FIG. 18 shows an example of a dither matrix.

FIG. 18 shows part of a dither matrix. The illustrated dither matrix stores threshold values selected at random in the tone value range of 0 to 255 and allocated to 64 pixels in both the vertical direction and the horizontal direction, that is, a total of 4096 pixels. The threshold value is selected in the tone value range of 0 to 255, since the image data is 1 byte data and takes the tone value in the tone value range of 0 to 255 for each pixel in this embodiment. The size of the dither matrix is not restricted to 64 pixels in the vertical direction and in the horizontal direction. The dither matrix may have any of diverse sizes and may include different number of pixels in the vertical direction and in the horizontal direction.

Figure 19:
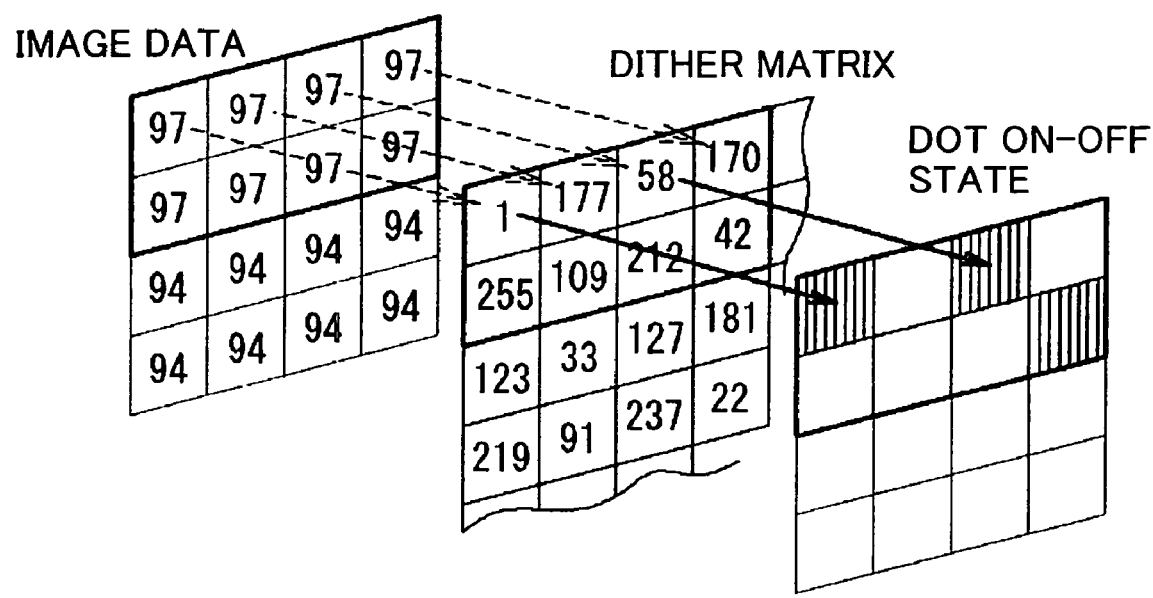
FIG. 19 conceptually shows a process of specifying the dot on-off state in each target pixel by referring to the dither matrix.

FIG. 19 conceptually shows a process of referring to the dither matrix and specifying the dot on-off state in each target pixel. The dot on-off state specification procedure first compares the tone value of each target pixel with a threshold value stored at a position corresponding to the target pixel in the dither matrix. Each arrow of thin broken line shows comparison between the tone value of each target pixel and a threshold value stored at the corresponding position in the dither matrix. When the tone value of the target pixel is greater than the threshold value in the dither matrix, the procedure specifies creation of a dot in the target pixel. When the tone value of the target pixel is smaller than the threshold value in the dither matrix, on the other hand, the procedure specifies creation of no dot in the target pixel. In the illustrated example of FIG. 19, the tone value of the image data is 97 in a pixel on the upper left corner, whereas the threshold value stored at the corresponding position in the dither matrix is equal to 1. The tone value of the image data is greater than the threshold value, so that creation of a dot is specified in this pixel. The arrow of solid line in FIG. 19 shows the process of specifying creation of a dot in this pixel and writing the result of the specification into the memory. The tone value of the image data in a pixel on the right is 97, while the threshold value in the dither matrix is 177. The threshold value in the dither matrix is greater than the tone value of the image data, so that creation of no dot is specified in this pixel. The processing of step S2040 in the flowchart of FIG. 17 refers to the dither matrix and specifies the dot on-off state in the target pixel.

It is determined whether the above series of processing has been concluded for all the pixels in the pixel group (step S2060). When there is any non-processed pixel in the pixel group (step S2060: No), the process goes back to step S2020 and repeats the above series of processing. When the processing has been concluded for all the pixels in the pixel group (step S2060: Yes), the process detects the number of dots to be created in the pixel group and stores the detected number of dots to be mapped to the pixel group in the memory (step S2080). In the illustrated example of FIG. 19, creation of dots in three pixels is specified with regard to the upper left pixel group of the image. The number of dots '3' is thus stored corresponding to this pixel group.

On completion of the processing with regard to one pixel group, it is then determined whether the processing has been completed for all the pixels (step S2100). When there is any non-processed pixel, the process goes back to step S2000 to generate a new pixel group, repeat the series of processing, and store the number of dots to be created in the new pixel group (step S2080). When this series of processing has been repeated and completed for all the pixels included in the image (step S2100: Yes), the number data representing the number of dots stored in each pixel group are output to the printer 200 (step S2120). The number data generation routine shown in FIG. 17 is then terminated.

Figure 20A:
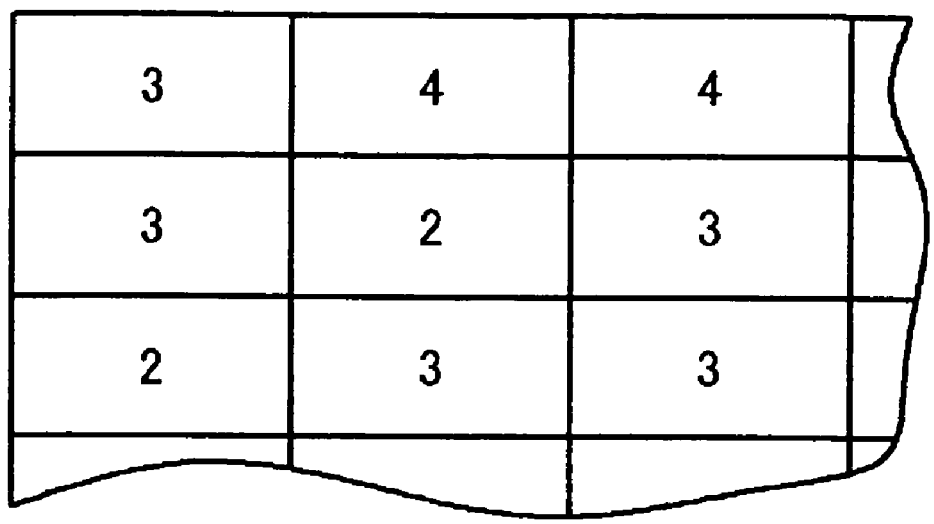
FIGS. 20A and 20B conceptually show conversion of number data into dot data.

FIG. 20A conceptually shows data obtained by the number data generation process of the image data. Each of multiple rectangles represents a pixel group. The numeral in each pixel group shows storage of the number of dots to be created in the pixel group. In this embodiment, the computer 100 converts the color-converted image data into the data shown in FIG. 20A and outputs only the number of dots stored in each pixel group as number data to the printer 200. Output of the number data desirably reduces the quantity of data, compared with output of the data representing the dot on-off state in each pixel (dot data). This arrangement thus ensures quick output. This advantage is described more in detail.

Figure 20B:
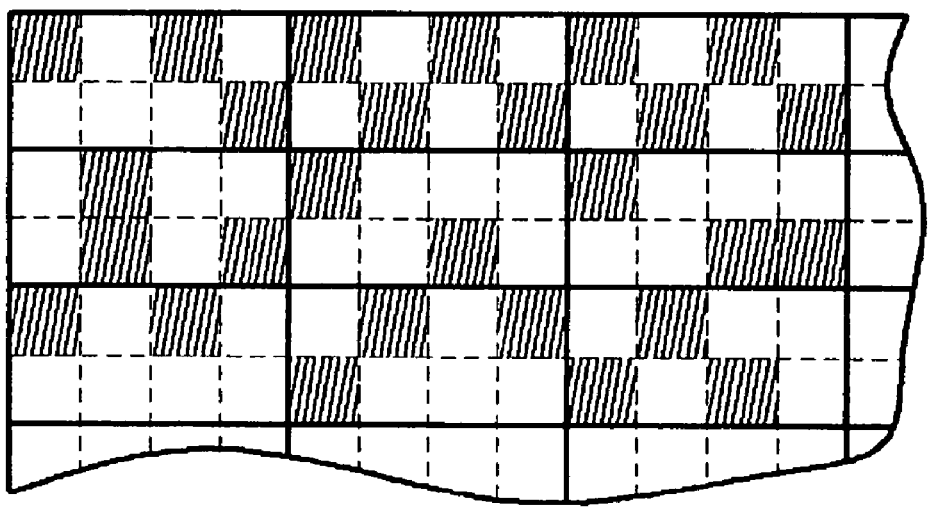

FIG. 20B shows specification of the dot on-off state in the respective pixels in pixel groups. The thin broken lines in FIG. 20B show that each pixel group consists of multiple pixels. The pixel filled with slant lines shows that creation of a dot is specified in the pixel.

The dot data shown in FIG. 20 are output from the computer 100 to the printer 200. When there is only one type of dots, each pixel takes either of only two states, the dot-on state or the dot-off state. The dot data for one pixel accordingly requires one bit. Each pixel group has eight pixels. The dot data output to the printer 200 is accordingly 8-bit data with respect to each pixel group.

The number of dots to be created in one pixel group is in a range of 0 to 8. The number data is accordingly 4-bit data with respect to each pixel group. Output of the number data reduces the quantity of data to half, compared with output of the dot data representing the dot on-off state in each pixel. This is the number data generation (encoding) process. The number data are quickly output to the printer 200.

The number data transferred from the computer 100 are decoded by the control circuit 260 in the printer 200 as described below. The number data are converted to the data representing the dot on-off state in each pixel and are output as control data to the ink ejection heads 244 through 247.

H. Number Data Decoding Process

Figure 21:
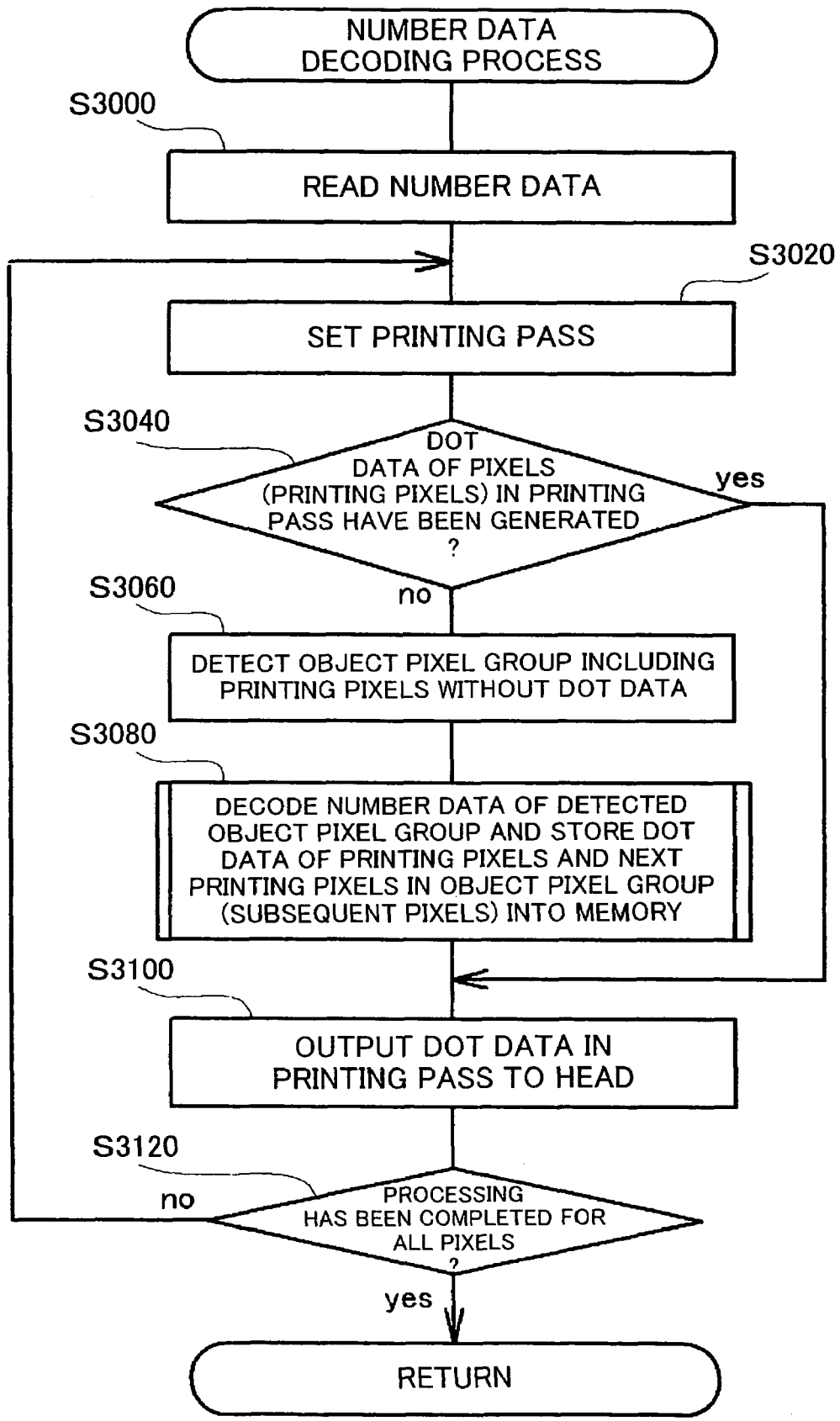
FIG. 21 is a flowchart showing a flow of number data decoding process in the embodiment.

FIG. 21 is a flowchart showing a flow of the number data decoding process executed in this embodiment. This processing flow is executed by the CPU built in the control circuit 260 of the printer 200. The printer 200 of this embodiment carries out this processing to convert the number data. This arrangement ensures quick decoding, while reducing the required memory capacity of the printer 200. This processing flow is described below according to the flowchart.

When the number data decoding process starts, the CPU of the control circuit 260 first reads the number data transferred from the computer 100 (step S3000) and sets a printing pass (step S3020). The printer 200 repeats the main scan and the sub-scan of each ink ejection head to create dots and thereby print an image on the printing paper.

As described previously with reference to FIG. 4, the ink ejection head has multiple nozzles. One main scan of the ink ejection head simultaneously creates dots by the multiple nozzles and forms multiple raster lines. These nozzles are arranged at the intervals of a nozzle pitch p. There is accordingly a gap corresponding to the nozzle pitch p between adjoining raster lines. Such gaps between the raster lines prevent reproduction of an image. The sub-scan is accordingly carried out to gradually shift the positions of formation of raster lines and fill the gaps with raster lines. The terminology 'pass' means an operation of main scan of the ink ejection head. The terminology 'printing pass' represents an array of dots formed by one main scan of the head with ejection of ink droplets.

Mainly due to the requirement of the picture quality, each raster line is formed not in only one pass but in multiple passes. In the case of formation of each raster line in one pass, a raster line is formed on passage of a nozzle. Namely each raster line is formed by one nozzle. In this case, if multiple nozzles on the head include a nozzle having different characteristics from those of the other nozzles, a raster line formed by the different nozzle is different from the other raster lines. The presence of such different raster lines among a large number of raster lines may significantly deteriorate the picture quality. In the case of formation of each raster line in multiple passes, on the other hand, different nozzles are used in the different passes to create dots. This arrangement thus prevents such deterioration of picture quality.

Figure 22:
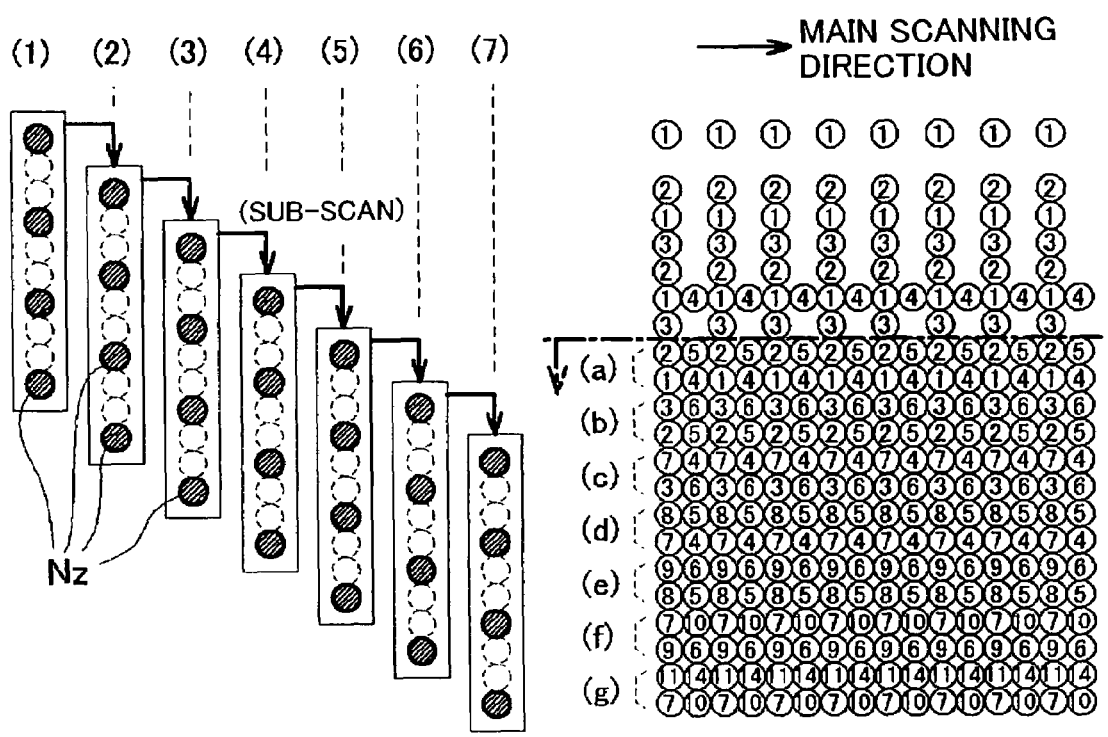
FIG. 22 shows a process of carrying out sub-scan and forming each raster line in multiple passes to print an image.

FIG. 22 conceptually shows that the printer 200 carries out the sub-scan and forms raster lines in multiple passes to print an image. As mentioned previously, the ink ejection head for each color has a number of nozzles (48 nozzles for each color in this embodiment). For the simplicity of explanation, it is assumed that the ink ejection head has only four nozzles in FIG. 22. The nozzle pitch is equal to 3, and each raster line is completed by two main scans.

The left half of FIG. 22 shows gradual shifts of the position of the ink ejection head relative to the printing paper by the sub-scan. Each long rectangle shown in the left half of FIG. 22 represents an ink ejection head for one color. A circle filled with slant line in the rectangle shows a nozzles Nz for ejecting an ink droplet. The ink ejection head for each color has four nozzles, and the interval between adjoining nozzles is set to a distance corresponding to two nozzles (a distance corresponding to 3 times the diameter of the nozzle between the nozzle centers).

The right half of FIG. 22 shows creation of dots on the printing paper by the main scan of the head. Each circle in the right half of FIG. 22 represents a dot created on the printing paper. As described previously with reference to FIG. 3, the actual sub-scan feeds printing paper and does not move the ink ejection head in the sub-scanning direction. For convenience of explanation, the illustration of FIG. 22 simulates motions of the head relative to the printing paper.

In the printing process, the head carries out the main scan to create dots at a position (1). This main scan creates dots expressed by No. 1 in the right half of FIG. 22 on the printing paper. The head is then moved in the sub-scanning direction by a distance corresponding to two raster lines. The head is accordingly shifted to a position (2) shown in the left half of FIG. 22. Each arrow of solid line in the left half of FIG. 22 shows a motion of sub-scan of the head. After the sub-scan, the head carries out the main scan again to create dots on the printing paper. This main scan creates dots expressed by No. 2 in the right half of FIG. 22 on the printing paper. The next sub-scan shifts the head to a position (3), and the main scan of the head with ejection of ink droplets creates dots expressed by No. 3. In this manner, the sub-scan and the main scan of the head are repeated to gradually move the position of the head and create dots. The gaps between raster lines are filled with other raster lines, and raster lines are formed without any gap in the subsequent area. In the illustrated example of FIG. 22, raster lines are formed without any gap on the printing paper in and after the 5th pass. Namely the area of and after the $5^{th}$ pass is an effective display area of the image.

The effective display area of FIG. 22 is examined closely. The $1^{st}$ raster line in this area consists of dots created in the 2nd pass and dots created in the $5^{th}$ pass (Namely this raster line is formed by two passes). A next raster line (the $2^{nd}$ raster line in the effective display area) consists of dots created in the $1^{st}$ pass and dots created in the $4^{th}$ pass. The $3^{rd}$ raster line in the effective display area consists of dots created in the $3^{rd}$ pass and dots created in the $6^{th}$ pass. Namely half of the dots on the $2^{nd}$ raster line are created, before any dots are created on the $1^{st}$ raster line in the effective display area. Half of the dots on the $1^{st}$ raster line are created, before the residual dots are created to complete the $2^{nd}$ raster line. Half of the dots on the $3^{rd}$ raster line are created, while the $2^{nd}$ raster line and the $1^{st}$ raster line are incomplete. After creation of the respective halves of dots on the $1^{st}$ to the $3^{rd}$ raster lines, the $2^{nd}$ raster line is completed in the $4^{th}$ pass. The $4^{th}$ pass creates half of the dots on the $5^{th}$ raster line, while completing the $2^{nd}$ raster line. The $5^{th}$ pass completes the $1^{st}$ raster line and creates half of the dots on the $4^{th}$ raster line. The $6^{th}$ pass complete the $3^{rd}$ raster line and creates half of the dots on the $6^{th}$ raster line.

In this manner, the printer 200 does not sequentially create dots from the pixels at the edge of the effective display area of the image but creates dots in a preset order like a mosaic pattern to complete a printed image. The processing of step S3020 in the flowchart of FIG. 21 accordingly sets a pass (printing pass) for dot creation. In the first cycle of the number data decoding process shown in FIG. 21, the $1^{st}$ pass is set to the printing pass.

{A084}

The CPU then determines whether dot data of pixels (printing pixels), in which dots are created in the preset printing pass, have been generated (step S3040). The ink ejection head has multiple nozzles, and one pass creates dots in pixels on multiple lines. It is accordingly determined whether dot data corresponding to all such pixels are stored in the RAM of the control circuit 260. When the $1^{st}$ pass is set to the printing pass, no dot data have been generated yet. The answer at step S3040 is 'No', and the CPU detects a pixel group including the printing pixels (step S3060). This process is described below with reference to FIG. 23.

Figure 23:
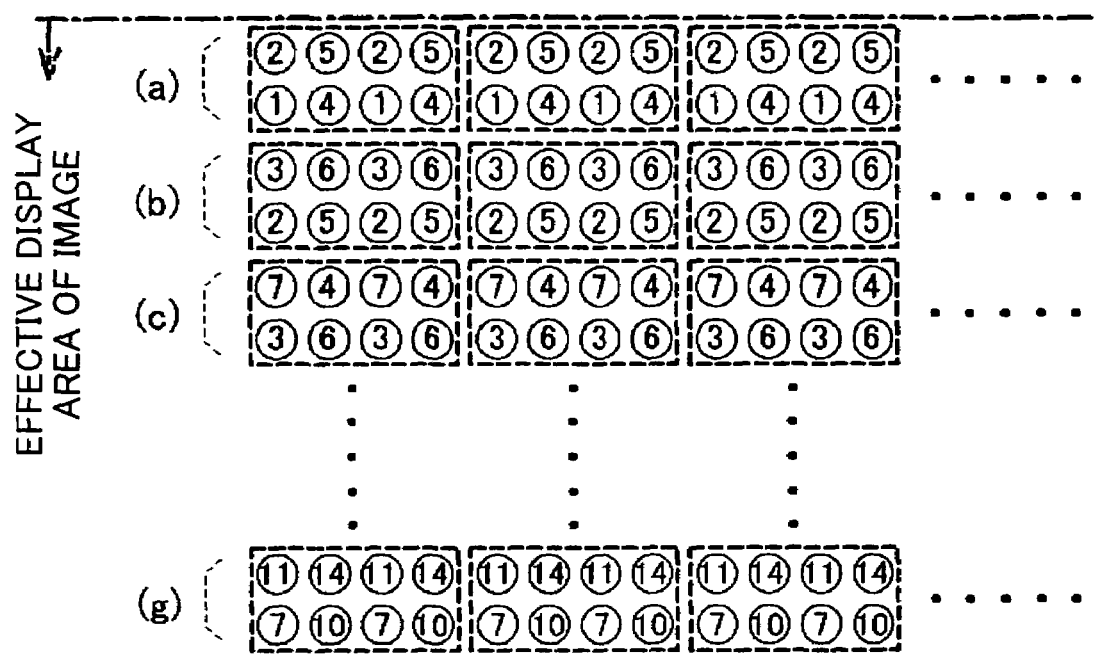
FIG. 23 shows an effective display area of an image.

FIG. 23 shows enlargement of the effective display area of the image shown in FIG. 22. As described above with reference to FIG. 22, the printing pixels in the $1^{st}$ pass are pixels of odd ordinal numbers on the $2^{nd}$ line in the effective display area. In this embodiment, the image data are treated in the unit of a pixel group, which includes 8 pixels in two rows and 4 columns. Each rectangle of broken line in FIG. 23 represents a pixel group treated as a unit. As shown in FIG. 23, the printing pixels in the $1^{st}$ pass are included in pixel groups on a line (a). The processing of step S3060 in the flowchart of FIG. 21 thus detects a pixel group on the line (a) as a pixel group including printing pixels.

The CPU decodes the number data of the detected pixel group and stores the dot data of the printing pixels and subsequent pixels into the memory (step S3080). The 'subsequent pixels' represent pixels in the detected pixels group, in which dots are created next to the printing pixels. As described above, the dots are created in a preset order like a mosaic pattern. The printing pixels and the subsequent pixels may not be formed in consecutive passes like the $2^{nd}$ pass and the $3^{rd}$ pass. For example, when the pixels included in the detected pixel group are formed in the $2^{nd}$ pass, the $4^{th}$ pass, the $5^{th}$ pass, and the $7^{th}$ pass and the printing pixels are the pixels formed in the $2^{nd}$ pass, the subsequent pixels are the pixels formed in the $4^{th}$ pass. The process of storing the dot data of the printing pixels and the subsequent pixels into the memory is described with reference to FIG. 24.

Figure 24:
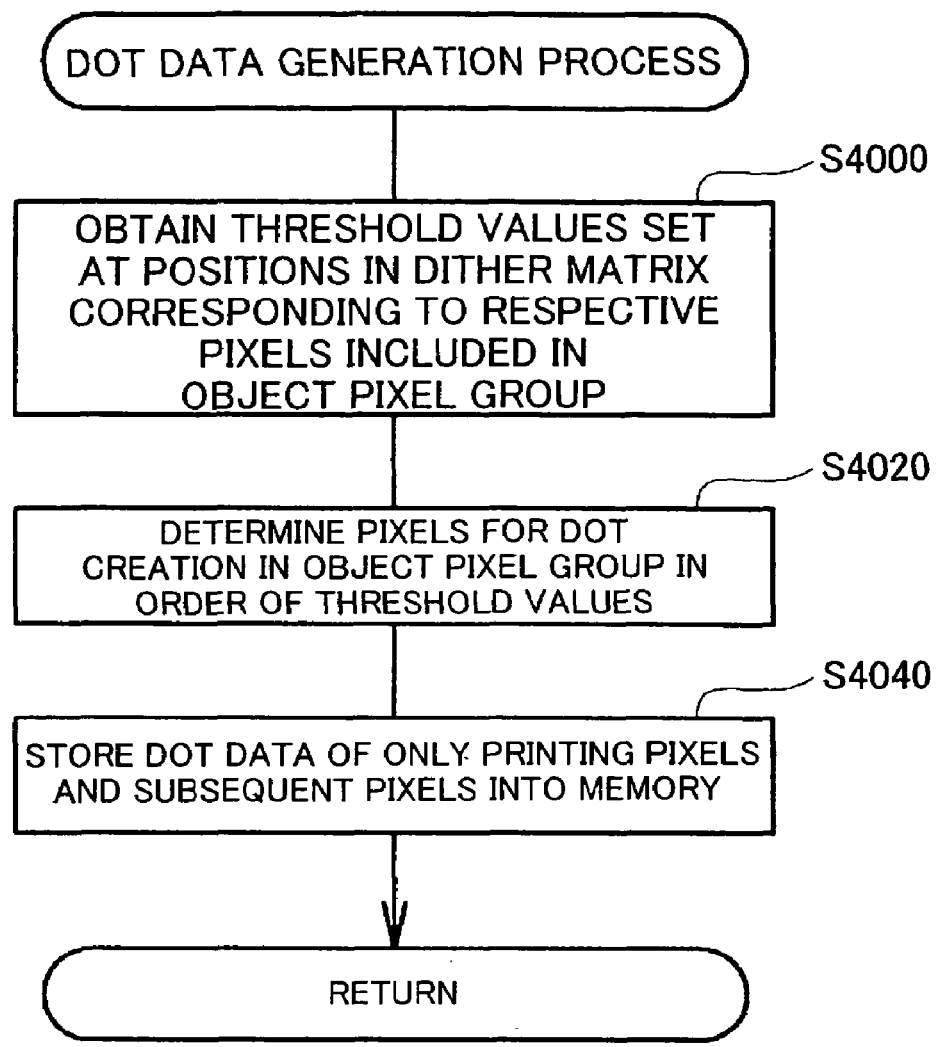
FIG. 24 is a flowchart showing a flow of process of generating dot data from number data.

FIG. 24 is a flowchart showing the process of storing the dot data of the printing pixels and the subsequent pixels into the memory (dot data generation process). This processing flow is described below according to the flowchart.

The dot data generation process first obtains threshold values stored at positions in a dither matrix corresponding to the respective pixels included in an object pixel group to be processed (step S4000). As described previously, for the specification of the number of dots to be created in one pixel group, the tone value of each target pixel is compared with a threshold value set at the corresponding position in the dither matrix (see FIGS. 17 through 19). The procedure here reads threshold values corresponding to the respective pixels included in the object pixel group from the dither matrix.

The dot data generation process then determines pixels, in which dots are to be created, in the object pixel group (step S4020). The pixels for dot creation in the object pixel group are determined, based on the threshold values in the dither matrix read out corresponding to the respective pixels and the number data with regard to the object pixel group. This method is described with reference to a concrete example shown in FIGS. 25A through 25E.

Figure 25A:
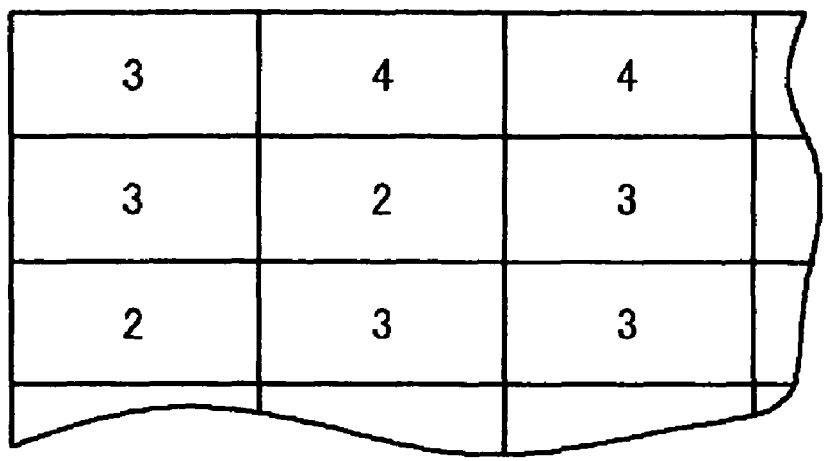
FIGS. 25A through 25E conceptually show a process of generating dot data from number data.
Figure 25B:
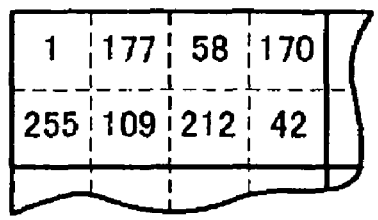

FIG. 25A conceptually shows number data with regard to respective pixel groups, which are received from the computer 100 and are stored in the RAM built in the control circuit 260 of the printer 200. The object pixel group to be processed is an upper left pixel group in FIG. 25A. FIG. 25B conceptually shows the process of obtaining threshold values set at positions corresponding to the pixels in the object pixel group from the dither matrix. The threshold values shown in FIG. 25B are regarded as potentials for dot creation in the object pixel group. As described previously with reference to FIG. 19, for the specification of the dot on-off state in one pixel, the tone value of the image data in the pixel is compared with the corresponding threshold value in the dither matrix. When the tone value of the image data is greater than the threshold value, it is determined that a dot is to be created in the pixel. The pixel having the smaller threshold value in the dither matrix shown in FIG. 25B has the higher potential for dot creation. The threshold value in the dither matrix is thus regarded as the potential for dot creation.

Figure 25C:
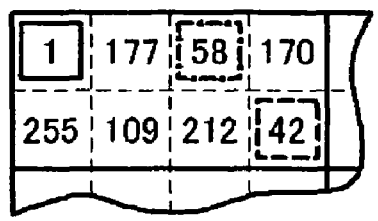
Figure 25D:
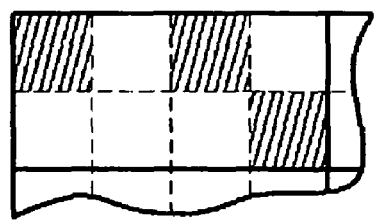
Figure 25E:

As shown in FIG. 25A, the number of dots to be created in the object pixel group (the upper left pixel group) is 3 according to the number data. Dots are created in the order of the potentials shown in FIG. 25B. As shown in FIG. 25C, dots are thus created in a pixel of solid line having the smallest threshold value, in a pixel of broken line having the second smallest threshold value, and in a pixel of one-dot chain line having the third smallest threshold value. FIG. 25D conceptually shows a process of converting the number data and generating the dot data with regard to the respective pixels in the object pixel group.

The processing of step S4020 in the flowchart of FIG. 24 converts the number data into dot data and thereby determines the pixels, in which dots are to be created, in the object pixel group.

After conversion of the number data into dot data with regard to the respective pixels, the dot data of only the printing pixels and the subsequent pixels are stored into the memory, that is, into the RAM built in the control circuit 260 (step S4040). Here the $1^{st}$ pass is set to the printing pass. The printing pixels are pixels expressed by 1 in FIG. 25E, that is, the left-end pixel and the second right pixel on the lower row. The subsequent pixels are pixels expressed by 2, that is, the left-end pixel and the second right pixel on the upper row. The processing of step S4040 in the flowchart of FIG. 24 stores dot data '0' for the printing pixels and dot data '1' for the subsequent pixels. The dot data '0' means that no dot is created in the pixel, while the dot data '1' means that a dot is created in the pixel.

After storage of the dot data of the printing pixels and the subsequent pixels with regard to the object pixel group into the memory, the CPU terminates the dot data generation process shown in FIG. 24 and returns to the number data decoding process shown in FIG. 21. For convenience of explanation, in the example of FIGS. 24 and FIGS. 25A through 25E, after generation of dot data of all the pixels included in the object pixel group, the dot data of only the printing pixels and the subsequent pixels are stored into the memory. The procedure may not generate dot data of all the pixels but may generate dot data of only the printing pixels and the subsequent pixels and store the dot data into the memory.

After return from the dot data generation process, the number data decoding process shown in FIG. 21 reads the dot data of the printing pixels from the memory and outputs the dot data to the ink ejection head (step S3100). The concrete procedure writes the dots data read from the RAM into the drive buffer 261. According to this dot data, ink droplets are ejected from the corresponding nozzles on the ink ejection head to create dots on the printing paper.

The CPU then determines whether the processing has been concluded for all the pixels (step S3120). Here only the dots in the $1^{st}$ pass have been created. The answer of the decision point is accordingly No, and the CPU goes back to step S3020 to set the $2^{nd}$ pass to the printing pass and determines whether dot data of the pixels for dot creation in the $2^{nd}$ pass have been generated (step S3040). As described above, in the first cycle of the number data decoding routine, dot data of the subsequent pixels as well as the printing pixels are stored in the memory. The processing of step S3040 thus determines whether the dot data of new printing pixels, in which dots are to be created, have already been stored in the memory.

As shown in FIGS. 22 and 23, the $2^{nd}$ pass creates dots in the pixels on the $1^{st}$ line and in the pixels on the $4^{th}$ line in the effective display area of the image. Dot data of the pixels on the $1^{st}$ line have been generated and stored into the memory, simultaneously with the dot data of the printing pixels in the $1^{st}$ pass in the first cycle of the routine, whereas no dot data have been generated with regard to the pixels on the $4^{th}$ line. Namely all the dot data of the printing pixels for dot creation in the $2^{nd}$ pass have not bet been generated. The answer of step S3040 is accordingly No, and the CPU detects a next object pixel group including the printing pixels without the dot data (step S3060). Dot data have not yet been stored with regard to the pixels on the $4^{th}$ line in the effective display area, among the printing pixels in the $2^{nd}$ pass. The processing of step S3060 thus detects an object pixel group on a line 'b' in FIG. 26.

The CPU subsequently generates dot data of the printing pixels and the subsequent pixels in the detected object pixel group and stores the generated dot data into the memory (step S3080). Here the printing pixels are pixels formed in the $2^{nd}$ pass. The subsequent pixels, that is, the pixels for next dot creation in the object pixel group, are pixels in the $3^{rd}$ pass.

After storage of the dot data with regard to the printing pixels and the subsequent pixels, the CPU outputs the dot data of the printing pass to the ink ejection head for dot creation (step S3100) and determines whether the processing has been completed for all the pixels (step S3120). When there are any non-processed pixels, the CPU goes back to step S3020 to set a new printing pass and determines whether all the dot data for the printing pass have been generated (step S3040). When all the dot data have been stored in advance (step S3040: Yes), the dot data are output to the ink ejection head for dot creation (step S3100). When there are any printing pixels without dot data (step S3040: No), on the other hand, the CPU detects a next object pixel group including the printing pixels (step S3060) and stores dot data with regard to the printing pixels and the subsequent pixels (step S3080).

When this series of processing is repeated and it is determined that the processing has been completed for all the pixels (step S3120: Yes), the CPU exits from the number data decoding process shown in FIG. 21 and terminates the image printing process shown in FIG. 15.

As described above, the number data decoding process of the embodiment converts number data into dot data and stores the dot data of the printing pixels and the subsequent pixels into the memory. This arrangement ensures quick conversion of the number data into dot data, while desirably reducing the required memory capacity of the printer 200. The reason of such advantages is discussed below.

Figure 26A:
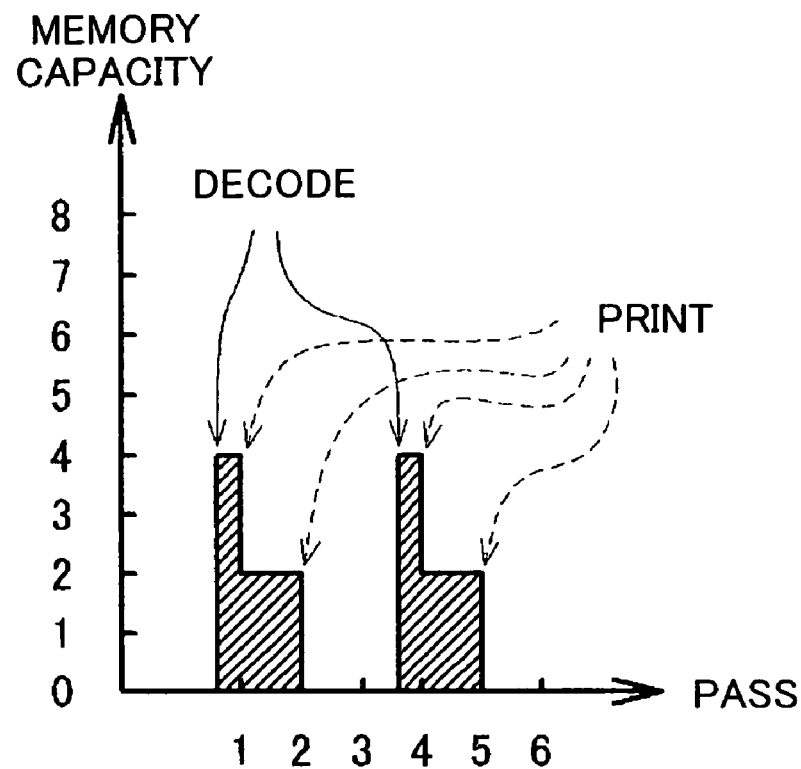
FIGS. 26A and 26B conceptually show one example of memory capacity required for storage of dot data generated by decoding number data in the case of dot creation with repeated main scans of an ink ejection head.
Figure 26B:
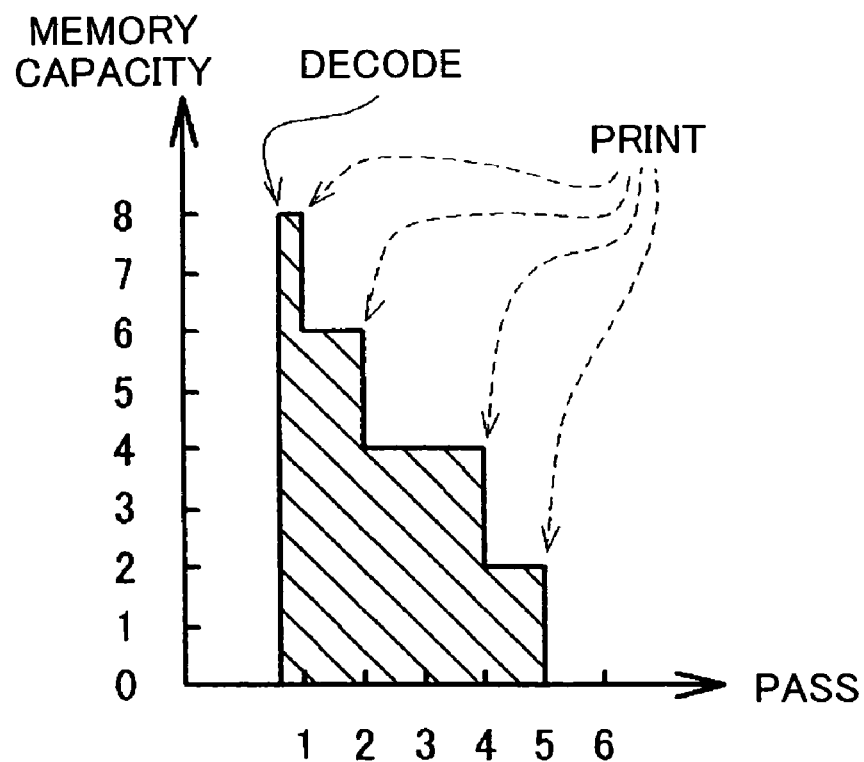

FIGS. 26A and 26B conceptually show the required memory capacity for dot data of pixels obtained by decoding number data, when the ink ejection head repeats the main scan to create dots. The memory capacity required for storage of the dot data is varied according to the pass of the head. In FIGS. 26A and 26B, for the simplicity of illustration, the memory capacity corresponds to one pixel group among pixel groups on the line 'a' in FIG. 23. FIG. 26A shows the memory capacity in the number data decoding process of the embodiment. FIG. 26B shows simultaneous storage of dot data for all the pixels in the pixel group into the memory as a reference.

As shown in FIG. 23, each pixel group on the line 'a' includes pixels where dots are formed in the $2^{nd}$ pass, pixels where dots are formed in the $4^{th}$ pass, and pixels where dots are formed in the $5^{th}$ pass, in addition to the pixels where dots are formed in the $1^{st}$ pass. With regard to each pixel group on the line 'a', the number data are decoded immediately before the main scan of the head in the $1^{st}$ pass. As described previously with reference to FIG. 21, the number data decoding process of the embodiment stores the dot data of the printing pixels and the subsequent pixels. The dot data of the pixels in the $1^{st}$ pass and the pixels in the $2^{nd}$ pass are thus simultaneously stored in the memory. In the example of FIG. 26A, the dot data corresponding to a total of 4 pixels, that is, 2 pixels formed in the $1^{st}$ pass and 2 pixels formed in the $2^{nd}$ pass, are once stored in the memory immediately before the main scan of the head in the $1^{st}$ pass. The main scan in the $1^{st}$ pass supplies half the dot data corresponding to 2 pixels to the head, and the main scan in the $2^{nd}$ pass supplies the residual half of the dot data corresponding to the other 2 pixels to the head.

After output of the dot data in the $1^{st}$ pass and in the $2^{nd}$ pass, the dot data corresponding to 4 pixels formed in the $4^{th}$ pass and in the $5^{th}$ pass are stored into the memory immediately before the main scan in the $4^{th}$ pass. The main scan in the $4^{th}$ pass supplies half the dot data corresponding to 2 pixels to the head, and the main scan in the $5^{th}$ pass supplies the residual half of the dot data corresponding to the other 2 pixels to the head. With regard to each pixel group on the line 'a' in FIG. 23, the memory capacity shown by slant lines in FIG. 26A is required for storage of the dot data.

In the case of storage of the dot data for all the pixels in the pixel group, on the other hand, dot data corresponding to 8 pixels are stored into the memory immediately before the main scan in the $1^{st}$ pass, as shown in FIG. 26B. The main scan in the $1^{st}$ pass outputs dot data corresponding to 2 pixels to the head, and the main scan in the $2^{nd}$ pass outputs dot data corresponding to another 2 pixels to the head. After the main scan of the head in the $2^{nd}$ pass, dot data corresponding to 4 pixels, that is, dot data to be output to the head by the main scan in the $4^{th}$ pass and in the $5^{th}$ pass, are stored in the memory. The main scan in the $4^{th}$ pass outputs dot data corresponding to 2 pixels to the head, and the main scan in the $5^{th}$ pass outputs dot data corresponding to the last 2 pixels to the head.

As clearly understood from the comparison between the area of slant lines in FIG. 26A and the area of slant lines in FIG. 26B, the image data decoding process of the embodiment significantly saves the required memory capacity, compared with the process of storing dot data for all the pixels in the pixel group. The image data decoding process of the embodiment also remarkably saves the maximum memory capacity required temporarily.

With regard to the pixels on the line 'a' in FIG. 23, the printing pixels and the subsequent pixels are formed in consecutive passes, for example, in the $1^{st}$ pass and in the $2^{nd}$ pass or in the $4^{th}$ pass and in the $5^{th}$ pass. Immediately after creation of dots in the printing pixels in one pass, dots are created in the subsequent pixels in a next pass. The required memory capacity can be significantly saved even when the printing pixels and the subsequent pixels are not formed in such consecutive passes. This is explained with an example of a pixel group on a line 'g' in FIG. 23.

Figure 27A:
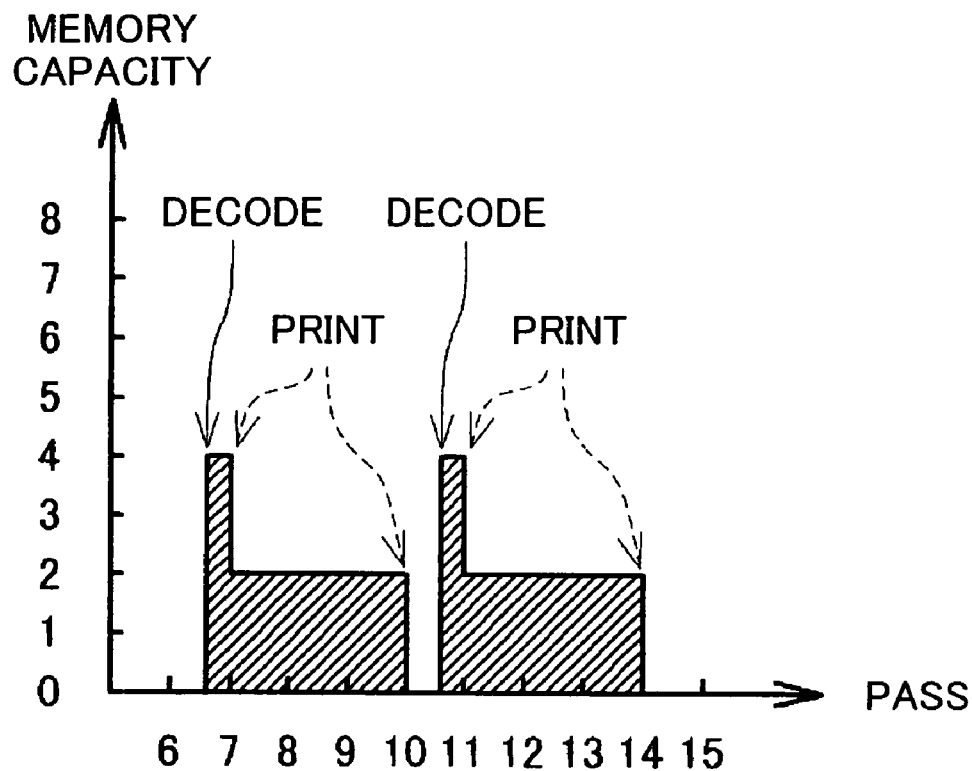
FIGS. 27A and 27B conceptually show another example of memory capacity required for storage of dot data generated by decoding number data in the case of dot creation with repeated main scans of an ink ejection head.
Figure 27B:
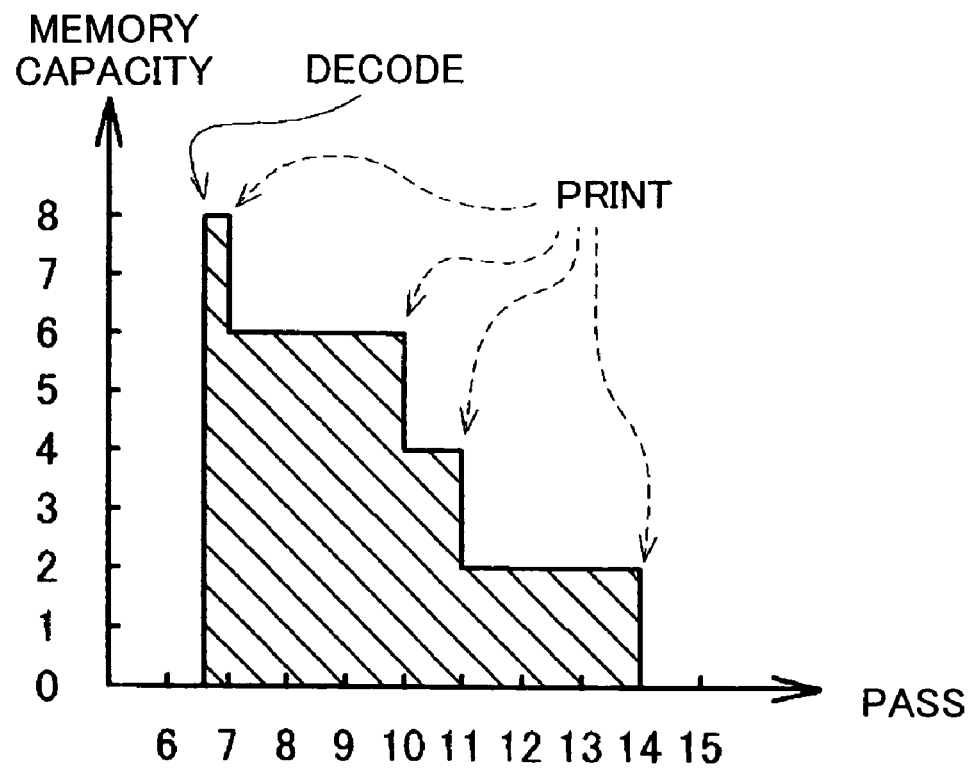

FIGS. 27A and 27B conceptually show the required memory capacity for dot data of pixels obtained by decoding number data with regard to each pixel group on the line 'g' in FIG. 23. FIG. 27A shows the memory capacity in the number data decoding process of the embodiment. FIG. 27B shows simultaneous storage of dot data for all the pixels in the pixel group into the memory as a reference.

As shown in FIG. 23, each pixel group on the line 'g' includes pixels where dots are formed in the $7^{th}$ pass, pixels where dots are formed in the $10^{th}$ pass, pixels where dots are formed in the $11^{th}$ pass, and pixels where dots are formed in the $14^{th}$ pass. With regard to each pixel group on the line 'g', the number data are decoded immediately before the main scan of the head in the $7^{th}$ pass.

As described previously with reference to FIG. 21, the number data decoding process of the embodiment stores the dot data corresponding to a total of 4 pixels, that is, printing pixels where dots are created in the $7^{th}$ pass and subsequent pixels where dots are created in the $10^{th}$ pass, into the memory. As shown in FIG. 27A, the dot data corresponding to 4 pixels are stored into the memory immediately before the main scan in the $7^{th}$ pass. The man scan in the $7^{th}$ pass outputs dot data corresponding to 2 pixels to the head, and the main scan in the 10th pass outputs dot data corresponding to the other 2 pixels to the head.

On completion of the main scan in the 10th pass, the dot data corresponding to a total of 4 pixels formed in the 11th pass and in the 14th pass are stored into the memory immediately before the main scan in the 11th pass. The main scan in the 11th pass outputs dot data corresponding to 2 pixels to the head, and the main scan in the 14th pass outputs dot data corresponding to the other 2 pixels to the head. With regard to each pixel group on the line 'g' in FIG. 23, the memory capacity shown by the slant lines in FIG. 27A is required for dot creation.

In the case of storage of the dot data for all the pixels in the pixel group, on the other hand, dot data corresponding to 8 pixels are stored into the memory immediately before the main scan in the 7th pass, as shown in FIG. 27B: The main scan in the 7th pass outputs dot data corresponding to 2 pixels to the head, and the main scans in the 10th pass, in the 11th pass, and in the 14th pass respectively output dot data corresponding to another 2 pixels to the head. The memory capacity shown by the slant lines in FIG. 27B is thus required for storage of dot data for all the pixels.

As clearly understood from the comparison between the area of slant lines in FIG. 27A and the area of slant lines in FIG. 27B, the image data decoding process of the embodiment significantly saves the required memory capacity.

Storage of dot data corresponding to only printing pixels further saves the memory capacity. But this method is required to decode the number data and write the dot data of printing pixels into the memory in each main scan of the head. This method thus undesirably lowers the processing speed. The procedure of this embodiment, on the other hand, is not required to decode the number data and write the dot data into the memory in each main scan of the head. This arrangement thus ensures quick conversion of number data into dot data.

The image data decoding process of the embodiment ensures the quick processing while saving the memory capacity, since the process of the embodiment does not simultaneously store dot data for all the pixels included in one pixel group but stores dot data of only printing pixels and other selected pixels. The process of the embodiment described above simultaneously stores dot data of the printing pixels and dot data of the subsequent pixels for next dot creation into the memory. The effects of the embodiment are, however, not restricted to this arrangement. Instead of storage of dot data corresponding to two passes, the procedure may simultaneously store dot data corresponding to an arbitrary number of passes, which is less than the total number of passes included in the pixel group. Dot data corresponding to only one pass may be stored, instead of dot data corresponding to multiple passes. In such cases, the procedure significantly saves the required memory capacity, compared with simultaneous storage of dot data corresponding to all the passes.

When the pixels selected for storage of dot data simultaneously with the printing pixels are pixels where dots are created at the closer timing to the printing pixels in the pixel group, this enhances the effect of saving the memory capacity.

The embodiments discussed above are to be considered in all aspects as illustrative and not restrictive. There may be many modifications, changes, and alterations without departing from the scope or spirit of the main characteristics of the present invention. For example, a software program (application program) that actualizes the above functions may be supplied to a main memory or an external storage device of a computer system via a communication line and executed by the computer system. The software program may be read from a CD-ROM or a flexible disk and executed.

What is claimed is:

1. A printing system that eventually converts original image data to be printed into dot data as data in unit of dots and prints an image in unit of raster lines as arrays of dots created according to the dot data, said printing system comprising:
   a print head that has multiple dot formation elements to create dots on a printing
   a print head control module that prints each raster line included in the image by at least two dot formation elements;
   an image data conversion module that converts the original image data into convened data, which is in a form prior to expansion into dot data corresponding to the multiple dot formation elements and is in a more compressed form than the dot data;
   a convened data storage module that stores the convened data;
   a data expansion module that successively reads out the stored convened data and expands the converted data into dot data for actuating the multiple dot formation elements; and
   an output module that outputs the expanded dot data to said print head control module,
   wherein said image data conversion module collects a preset number of multiple pixels in the image into each pixel group and specifies a number of dots to be created in each pixel group based on the image data, so as to obtain the convened data,
   said convened data storage module stores data representing the specified number of dots to be created in each pixel group as the convened data, and
   said data expansion module converts the stored data representing the specified number of dots into the dot data and comprises a dot data storage module, which simultaneously stores the converted dot data at least once with respect to M pixel sets included in each pixel group, where M is an integer of not less than 2 but of less than N, which is a total number of pixel sets included in the pixel group.

2. A printing system that eventually converts original image data to be printed into dot data as data in unit of dots and prints an image in unit of raster lines as arrays of dots created according to the dot data, said printing system comprising:
   a print head that has multiple dot formation elements to create dots on a printing medium;
   a print head control module that prints each raster line included in the image by at least two dot formation elements;
   an image data conversion module that converts the original image data into converted data, which is in a form prior to expansion into dot data corresponding to the multiple dot formation elements and is in a more compressed form than the dot data;
   a converted data storage module that stores the converted data;
   a data expansion module that successively reads out the stored converted data and expands the converted data into dot data for actuating the multiple dot formation elements; and
   an output module that outputs the expanded dot data to said print head control module,
   wherein said image data conversion module collects a preset number of multiple pixels in the image into each pixel group and specifies a number of dots to be created in each pixel group based on the image data, so as to obtain the converted data, said converted data storage module stores data representing the specified number of dots to be created in each pixel group as the converted data, said data expansion module converts the stored data representing the specified number of dots into the dot data and comprises a dot data storage module, which simultaneously stores the converted dot data at least once with respect to M pixel sets included in each pixel group, where M is an integer of not less than 2 but of less than N, which is a total number of pixel sets included in the pixel group, and said dot data storage module simultaneously stores dot data with respect to at least multiple pixel sets, in which dots are consecutively created in the pixel group, as the dot data with respect to the M pixel sets.

3. A printing system that eventually converts original image data to be printed into dot data as data in unit of dots and prints an image in unit of raster lines as arrays of dots created according to the dot data, said printing system comprising:

a print head that has multiple dot formation elements to create dots on a printing a print head control module that prints each raster line included in the image by at least two dot formation elements;

an image data conversion module that converts the original image data into converted data, which is in a form prior to expansion into dot data corresponding to the multiple dot formation elements and is in a more compressed form than the dot data;

a converted data storage module that stores the converted data;

a data expansion module that successively reads out the stored converted data and expands the converted data into dot data for actuating the multiple dot formation elements; and an output module that outputs the expanded dot data to said print head control module, wherein said image data conversion module collects a preset number of multiple pixels in the image into each pixel group and specifies a number of dots to be created in each pixel group based on the image data, so as to obtain the converted data, said converted data storage module stores data representing the specified number of dots to be created in each pixel group as the converted data, said data expansion module converts the stored data representing the specified number of dots into the dot data and comprises a dot data storage module, which simultaneously stores the converted dot data at least once with respect to M pixel sets included in each pixel group, where M is an integer of not less than 2 but of less than N, which is a total number of pixel sets included in the pixel group, and said dot data storage module simultaneously stores dot data with respect to at least multiple pixel sets, which are left at last in the pixel group, as the dot data with respect to the M pixel sets.

4. A printing system that eventually converts original image data to be printed into dot data as data in unit of dots and prints an image in unit of raster lines as arrays of dots created according to the dot data, said printing system comprising:

a print head that has multiple dot formation elements to create dots on a printing a print head control module that prints each raster line included in the image by at least two dot formation elements;

an image data conversion module that converts the original image data into converted data, which is in a form prior to expansion into dot data corresponding to the multiple dot formation elements and is in a more compressed form than the dot data;

a converted data storage module that stores the converted data;

a data expansion module that successively reads out the stored converted data and expands the converted data into dot data for actuating the multiple dot formation elements; and an output module that outputs the expanded dot data to said print head control module, wherein said image data conversion module collects a preset number of multiple pixels in the image into each pixel group and specifies a number of dots to be created in each pixel group based on the image data, so as to obtain the converted data, said converted data storage module stores data representing the specified number of dots to be created in each pixel group as the converted data, said data expansion module converts the stored data representing the specified number of dots into the dot data and comprises a dot data storage module, which simultaneously stores the converted dot data at least once with respect to M pixel sets included in each pixel group, where M is an integer of not less than 2 but of less than N, which is a total number of pixel sets included in the pixel group, and said dot data storage module converts the number data into the dot data in an order of pixels having potential for dot creation in the pixel group and stores the dot data.

5. A printing device that receives data corresponding to an object image to be printed from outside of the printing device and creates dots on a printing medium, so as to print the object image according to the received data, said printing device comprising:

a print head that has multiple dot formation elements to create dots on the printing medium;

a print head control module that prints each raster line included in the image by at least two dot formation elements;

a converted data storage module that stores converted data, which is obtained by converting the object image in a form prior to expansion into dot data corresponding to the multiple dot formation elements and in a more compressed form than the dot data;

a data expansion module that successively reads out the stored converted data and expands the converted data into dot data for actuating the multiple dot formation elements; and an output module that outputs the expanded dot data to said print head control module, wherein said converted data storage module stores data representing a specified number of dots to be created in each pixel group as the converted data, where a preset number of multiple pixels in the image are collected into each pixel group and the number of dots to be created in each pixel group is specified based on the image data, and said data expansion module converts the stored data representing the specified number of dots into the dot data and comprises a dot data storage module, which simultaneously stores the converted dot data at least once with respect to M pixel sets included in each pixel group, where M is an integer of not less than 2 but of less than N, which is a total number of pixel sets included in the pixel group.

6. A printing method that eventually converts original image data to be printed into dot data as data in unit of dots and actuates multiple dot formation elements mounted on a print head according to the dot data, so as to create dots on a printing medium and print an image in unit of raster lines as arrays of dots, said printing method comprising the steps of:

converting the original image data into convened data, which is in a form prior to expansion into dot data corresponding to the multiple dot formation elements and is in a more compressed form than the dot data;

storing the converted data into a memory;

successively reading out the stored convened data and expanding the convened data into dot data for actuating the multiple dot formation elements;

arranging the expanded dot data to make each raster line included in the image formed by at least two dot formation elements; and actuating the dot formation elements on the print head, based on the arranged dot data, wherein said storing step stores data representing a specified number of dots to be created in each pixel group in the memory as the converted data, where a preset number of multiple pixels in the image are collected into each pixel group and the number of dots to be created in each pixel group is specified based on the image data, and said expanding step converts the stored data representing the specified number of dots into the dot data and simultaneously stores the convened dot data at least once with respect to M pixel sets included in each pixel group, where M is an integer of not less than 2 but of less than N, which is a total number of pixel sets included in the pixel group.

7. A printing method that eventually converts original image data to be printed into dot data as data in unit of dots and actuates multiple dot formation elements mounted on a print head according to the dot data, so as to create dots on a printing medium and print an image in unit of raster lines as arrays of dots, said printing method comprising the steps of:

storing converted data in a memory, where the converted data is obtained by converting the original image data in a form prior to expansion into dot data corresponding to the multiple dot formation elements and in a more compressed form than the dot data;

successively reading out the stored convened data and expanding the convened data into dot data for actuating the multiple dot formation elements;

arranging the expanded dot data to make each raster line included in the image formed by at least two dot formation elements; and actuating the dot formation elements on the print head, based on the arranged dot data, wherein said storing step stores data representing a specified number of dots to be created in each pixel group in the memory as the converted data, where a preset number of multiple pixels in the image are collected into each pixel group and the number of dots to be created in each pixel group is specified based on the image data, and said expanding step converts the stored data representing the specified number of dots into the dot data and simultaneously stores the convened dot data at least once with respect to M pixel sets included in each pixel group, where M is an integer of not less than 2 but of less than N, which is a total number of pixel sets included in the pixel group.

* * * * *